(12) United States Patent
Tang et al.

(10) Patent No.: US 12,638,946 B2
(45) Date of Patent: May 26, 2026

(54) TOUCHSCREEN AND ELECTRONIC DEVICE

(71) Applicant: HUAWEI TECHNOLOGIES CO., LTD., Shenzhen (CN)

(72) Inventors: Tao Tang, Dongguan (CN); Jianping Fang, Beijing (CN); Haohui Long, Beijing (CN); Yao Wang, Dongguan (CN); Junyong Zhang, Dongguan (CN); Hailong Jing, Shenzhen (CN); Hao Wu, Dongguan (CN); Gang Fang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/188,038

(22) Filed: Apr. 24, 2025

(65) Prior Publication Data

US 2025/0315133 A1 Oct. 9, 2025

Related U.S. Application Data

(63) Continuation of application No. PCT/CN2023/126075, filed on Oct. 24, 2023.

(30) Foreign Application Priority Data

Oct. 25, 2022 (CN) .......................... 202211310787.2

(51) Int. Cl.
G06F 3/044 (2006.01)
(52) U.S. Cl.
CPC .......... *G06F 3/0446* (2019.05); *G06F 3/0443* (2019.05); *G06F 2203/04102* (2013.01)

(58) Field of Classification Search
CPC ................. G06F 3/0446; G06F 3/0443; G06F 2203/04102; G06F 1/1652; G06F 2203/04112; G06F 2203/04111
See application file for complete search history.

(56) References Cited

U.S. PATENT DOCUMENTS

| | | | | |
|---|---|---|---|---|
| 2020/0042116 A1* | 2/2020 | Li | .......................... | H10K 50/844 |
| 2020/0225792 A1* | 7/2020 | Hu | .......................... | G06F 3/0446 |
| 2022/0334678 A1 | 10/2022 | Long | | |

FOREIGN PATENT DOCUMENTS

| | | |
|---|---|---|
| CN | 109213369 A | 1/2019 |
| CN | 114489363 A | 5/2022 |
| CN | 115756194 A | 3/2023 |
| WO | 2022087802 A1 | 5/2022 |

OTHER PUBLICATIONS

Machine translation of CN114489363A (Year: 2022).*

* cited by examiner

*Primary Examiner* — Antonio Xavier

(57) ABSTRACT

The present disclosure provides a touchscreen having a bending region. A touch layer is disposed in the bending region, a grid line is arranged at the touch layer, a plurality of channels for disconnecting the grid line are further disposed at the touch layer, the plurality of channels divide the grid line into a plurality of electrode regions, a grid line between any two adjacent electrode regions forms a fracture at a channel, and a width of the fracture is greater than or equal to 8 μm.

20 Claims, 26 Drawing Sheets

10

P-P

12'

1211'

12111'

100a

52112

52111

TOUCHSCREEN AND ELECTRONIC DEVICE

CROSS-REFERENCE TO RELATED APPLICATIONS

This application is a continuation of International Application No. PCT/CN2023/126075, filed on Oct. 24, 2023, which claims priority claims priority to Chinese Patent Application No. 202211310787.2, filed on Oct. 25, 2022. The disclosures of the aforementioned applications are hereby incorporated by reference in their entireties.

TECHNICAL FIELD

The present disclosure relates to the field of electronic components, and in particular, to a touchscreen and an electronic device.

BACKGROUND

An electronic device is usually equipped with a touchscreen to implement touch control and picture display functions of the electronic device. In a flexible foldable electronic device, a region in which a touchscreen can be flexibly bent is usually referred to as a bending region.

When the electronic device is being bent, due to insufficient resilience of a material of a part of film layer in the touchscreen and poor bending performance, large stress is concentrated in the bending region of the touchscreen, and cracks likely occur in the part of film layer. As a result, a problem such as a black spot, a screen failure, or the like is prone to occur during display of the electronic device. In addition, because there may be some cabling sharp corners, terminals, and the like in graphic design of a part of film layer of the touchscreen, stress is further concentrated at cabling sharp corners and tips in a bending process of the touchscreen. As a result, each film layer in the touchscreen bears large pull force and use reliability of the touchscreen is reduced.

SUMMARY

The present disclosure provides a touchscreen and an electronic device having the touchscreen. A film layer structure in the touchscreen is optimized in a targeted manner, so that stress concentration generated when the touchscreen is bent can be improved, thereby reducing a risk that a crack may occur on the film layer when the touchscreen is bent, and further improving a yield rate and user experience of the electronic device. The present disclosure specifically includes the following technical solutions.

According to a first aspect, the present disclosure provides a touchscreen having a bending region. A touch layer is disposed in the bending region, a grid line is arranged at the touch layer, a plurality of channels for disconnecting the grid line are further disposed at the touch layer, the plurality of channels divide the grid line into a plurality of electrode regions, a grid line between any two adjacent electrode regions forms a fracture at a channel, and a width of the fracture is greater than or equal to 8 μm.

On the touchscreen in the present disclosure, the grid line is arranged at the touch layer, and the plurality of channels are disposed to disconnect the grid line, so that the grid line can be divided into the plurality of independent electrode regions, to implement a touch sensing detection function of the touch layer through cooperation between the plurality of electrode regions, and enable the touchscreen to implement touch control effect.

On the touchscreen in the present disclosure, the width of the fracture is set to be greater than or equal to 8 μm, to expand a width of the channel, so that when the touchscreen is bent, stress concentration at the fracture can be reduced, a crack, a break, or the like of each film layer at the touch layer at the fracture can be avoided, and use reliability and a service life of the touchscreen can be further improved.

In a possible implementation, the grid line includes a plurality of first sub-grid lines that are parallel to each other and a plurality of second sub-grid lines that are parallel to each other, and any first sub-grid line intersects the plurality of second sub-grid lines to form a plurality of intersection parts. The grid line has a terminal at the fracture, one end of the terminal communicates with the intersection part, the other end of the terminal is constructed as a boundary of the fracture, and a length of the terminal is from 0.5 μm to 3 μm.

In this implementation, the plurality of first sub-grid lines that are parallel to each other and the plurality of second sub-grid lines that are parallel to each other are disposed, and the any first sub-grid line is disposed to intersect the plurality of second sub-grid lines, so that the first sub-grid line and the second sub-grid line can form a grid structure. In this way, light emission during display of an electronic device is not affected while a normal function of each electrode region can be ensured. In other words, the first sub-grid line and the second sub-grid line are disposed to intersect to form the grid structure, so that a light-emitting rate and light-emitting effect of display of the electronic device can be ensured while the touch sensing and detection functions of the touch layer is implemented. The length of the terminal is set to 0.5 μm to 3 μm, so that stress concentration generated because the grid line has a sharp corner at the intersection part can be avoided. In addition, the length of the terminal at the fracture is set to 0.5 μm to 3 μm, to further expand the width of the channel, thereby further reducing the stress concentration at the fracture during bending.

In a possible implementation, each fracture is parallel to a bending central axis of the bending region.

In this implementation, the fractures are disposed to be all parallel to the bending central axis of the bending region, that is, boundaries of the fractures are disposed to be parallel to the bending central axis, to disperse the stress generated when the touchscreen is bent, and avoid the stress concentration at the fracture. In addition, the fractures are disposed to be all parallel to the bending central axis of the bending region, so that areas of the fractures in a direction in the bending central axis can be increased, the stress generated during bending can be further dispersed, and the stress concentration can be avoided.

In a possible implementation, a width of the terminal is greater than a width of the grid line.

In this implementation, the width of the terminal is set to be greater than the width of the grid line, so that a stress bearing area at the terminal when the touchscreen is bent can be increased, and stress generated at the terminal when the touchscreen is bent can be further dispersed, to improve stress concentration at the terminal during bending.

In a possible implementation, the width of the terminal is greater than or equal to 3.5 μm.

In this implementation, the width of the terminal is set to be greater than or equal to 3.5 μm, to increase a force-bearing area of the terminal, so as to disperse the stress generated at the terminal when the touchscreen is bent, thereby improving the stress concentration at the terminal during bending.

In a possible implementation, in a plane direction of the touch layer, a shape of a boundary at which the terminal is constructed as the fracture is an arc.

In this implementation, the shape of the boundary at which the terminal is constructed as the fracture is disposed to be the arc, so that the stress concentrated at the terminal can be smoothly transited and dispersed at the boundary at which the terminal is constructed as the fracture, thereby further reducing the stress concentration.

In a possible implementation, in the plane direction of the touch layer, the shape of the boundary at which the terminal is constructed as the fracture is a circular arc.

In a possible implementation, the touch layer includes an electrode sub-layer, an insulation sub-layer, and a connection sub-layer that are stacked, the electrode sub-layer is constructed as the grid line arranged on a first surface of the insulation sub-layer, the plurality of channels for disconnecting the grid line are further disposed at the electrode sub-layer, and the plurality of channels divide the grid line into the plurality of electrode regions; and the connection sub-layer is located on a second surface that is of the insulation sub-layer and that is away from the first surface, a plurality of connection sections are disposed at the connection sub-layer, a plurality of vias are disposed at the insulation sub-layer, and at least some of the electrode regions are sequentially conducted through the vias and the connection sections.

In this implementation, the plurality of connection sections are further disposed at the connection sub-layer, the plurality of vias are disposed at the insulation sub-layer, and effect of bridging is implemented at the connection sections through the vias, that is, the connection sections sequentially conduct the at least some of the electrode regions through the vias, so that the at least some of the electrode regions can be conducted to each other and implement functions thereof.

In a possible implementation, a plurality of support sections are disposed at the connection sub-layer, and in a length direction of each support section, projection of each support section on the first surface covers one fracture.

In this implementation, the support section is disposed, and in the length direction of each support section, the projection of each support section on the first surface is disposed to cover one fracture. In this way, the support section overlaps the terminal in a direction in which the electrode sub-layer is opposite to the insulation sub-layer, so that the support section functions as a reinforcing rib at the connection sub-layer, that is, a stress bearing capacity of the connection sub-layer at the fracture can be enhanced, and a crack, a break, or the like of the connection sub-layer at the fracture can be avoided.

In a possible implementation, a length of the support section is greater than or equal to 4 μm.

In this implementation, the length of the support section is set to be greater than or equal to 4 μm, so that a stress bearing capacity of the support section can be ensured, to further improve the stress bearing capacity of the connection sub-layer at the fracture.

In a possible implementation, the grid line has a terminal at the fracture, and the terminal is constructed as a boundary of the fracture; and one terminal has a first length L1, a length of an overlapping part between the projection of the support section on the first surface and the terminal is a second length L2, and the second length L2 is less than or equal to ½L1.

In this implementation, the second length L2 of the overlapping part between the projection of the support section on the first surface and the terminal is set to be less than or equal to ½L1, so that an overlapping length between the support section and the terminal in the direction in which the electrode sub-layer is opposite to the insulation sub-layer can be ensured, to further ensure the stress bearing capacity of the support section.

In a possible implementation, a width of the terminal is greater than or equal to a width of the support section.

In this implementation, the width of the terminal is set to be greater than or equal to the width of the support section, so that the stress bearing capacity of the connection sub-layer during bending can be improved, and the support section does not affect the light emission during the display of the electronic device, to improve use effect and applicability of the touch layer.

In a possible implementation, the electrode region has a first connection end at the via, the connection section has a second connection end at the via, and projection of the second connection end on the first surface is accommodated in the first connection end.

In this implementation, the projection of the second connection end on the first surface is disposed to be accommodated in the first connection end, to increase a stress bearing area of the grid line, thereby avoiding stress concentration at the first connection end.

In a possible implementation, in a plane direction of the touch layer, a distance between an edge of the projection of the second connection end on the first surface and an edge of the first connection end is from 1 μm to 3 μm.

In this implementation, the distance between the edge of the projection of the second connection end on the first surface and the edge of the first connection end is set to 1 μm to 3 μm, so that a stress bearing area of the first connection end can be ensured, and impact of the first connection end on the light emission during the display of the electronic device can be avoided, to improve the use effect and the applicability of the touch layer.

In a possible implementation, the electrode region includes a plurality of first electrodes, a plurality of second electrodes, and a plurality of conduction sections, the plurality of first electrodes are arranged in an array and staggered with the plurality of second electrodes, and the conduction section is connected between any two adjacent first electrodes in a first direction, to conduct the plurality of first electrodes in the first direction; and the connection section is connected between any two adjacent second electrodes in a second direction, to sequentially conduct the plurality of second electrodes in the second direction, where an included angle is between the first direction and the second direction.

In this implementation, the plurality of first electrodes are disposed to be sequentially conducted in the first direction, and the plurality of second electrodes are disposed to be sequentially conducted in the second direction, so that the touch layer can implement touch detection and sensing functions, and can accurately detect and sense touch points.

In a possible implementation, the first electrode is a touch driving electrode, and the second electrode is a touch sensing electrode.

In a possible implementation, the first electrode is a touch sensing electrode, and the second electrode is a touch driving electrode.

In a possible implementation, the touchscreen further includes a non-bending region, the non-bending region is located on at least one side of the bending region, and the touch layer is further at least partially disposed in the non-bending region.

In this implementation, the touch layer is disposed to be at least partially disposed in the non-bending region, so that each film layer structure of the touch layer located in the non-bending region can be optimized, to improve a stress bearing capacity of each film layer located in the non-bending region, reduce stress concentration of each film layer located in the non-bending region, and avoid a film layer break, a film layer crack, or the like of the touchscreen in the non-bending region.

In a possible implementation, the non-bending region is located on two opposite sides of the bending region.

In a possible implementation, the touch layer completely covers the non-bending region.

In this implementation, the touch layer is disposed to completely cover the non-bending region, so that a crack or a break that occurs at each film layer in the touchscreen can be reduced, thereby ensuring use reliability of the entire touchscreen.

In a possible implementation, the touchscreen further includes a flexible substrate and an organic coating layer, the touch layer is stacked between the flexible substrate and the organic coating layer, and the electrode sub-layer of the touch layer is disposed on a side that is of the insulation sub-layer and that is away from the flexible substrate.

In this implementation, the flexible substrate is disposed to support and bear the touch layer, to ensure normal use and function implementation of the touch layer. The organic coating layer can be configured to package and protect the touch layer, to avoid that normal function use of the touchscreen is affected because of erosion of each film layer structure or another electronic structure in the touchscreen by external dust and water vapor or the like.

In a possible implementation, the touchscreen further includes a buffer layer, and the buffer layer is connected between the flexible substrate and the connection sub-layer of the touch layer and is configured to relieve pressure on the touch layer.

In this implementation, the buffer layer is disposed between the flexible substrate and the connection sub-layer of the touch layer, so that the buffer layer can relieve the pressure on the touch layer, and further protect each film layer at the touch layer.

According to a second aspect, the present disclosure further provides a touchscreen having a bending region. A touch layer is disposed in the bending region, a grid line is arranged at the touch layer, a plurality of channels for disconnecting the grid line are further disposed at the touch layer, the plurality of channels divide the grid line into a plurality of electrode regions, a grid line between any two adjacent electrode regions forms a fracture at a channel, and each fracture is parallel to a bending central axis of the bending region.

On the touchscreen in the present disclosure, the grid line is also arranged at the touch layer, and the plurality of channels are disposed to disconnect the grid line, so that the grid line can be divided into the plurality of independent electrode regions, to implement a touch sensing and detection function of the touch layer through cooperation between the plurality of electrode regions, and enable the touchscreen to implement touch control effect.

On the touchscreen in the present disclosure, the fractures are disposed to be all parallel to the bending central axis of the bending region, that is, boundaries of the fractures are disposed to be parallel to the bending central axis, to disperse stress generated when the touchscreen is bent, and avoid stress concentration at the fracture. In addition, the fractures are disposed to be all parallel to the bending central axis of the bending region, so that areas of the fractures in a direction in the bending central axis can be increased, the stress generated during bending can be further dispersed, the stress concentration can be avoided, and a crack, a break, or the like of each film layer at the touch layer at the fracture can be avoided, to improve use reliability and a service life of the touchscreen.

In a possible implementation, a width of the fracture is from 4 μm to 5.5 μm.

In a possible implementation, the touch layer includes an electrode sub-layer, an insulation sub-layer, and a connection sub-layer that are stacked, the electrode sub-layer is constructed as the grid line arranged on a first surface of the insulation sub-layer, the plurality of channels for disconnecting the grid line are further disposed at the electrode sub-layer, and the plurality of channels divide the grid line into the plurality of electrode regions; and the connection sub-layer is located on a second surface that is of the insulation sub-layer and that is away from the first surface, a plurality of connection sections are disposed at the connection sub-layer, a plurality of vias are disposed at the insulation sub-layer, and at least some of the electrode regions are sequentially conducted through the vias and the connection sections.

In a possible implementation, a plurality of support sections are disposed at the connection sub-layer, and in a length direction of each support section, projection of each support section on the first surface covers one fracture.

In a possible implementation, a length of the support section is greater than or equal to 4 μm.

In a possible implementation, the grid line has a terminal at the fracture, and the terminal is constructed as a boundary of the fracture; and one terminal has a first length L1, a length of an overlapping part between the projection of the support section on the first surface and the terminal is a second length L2, and the second length L2 is less than or equal to ½L1.

In a possible implementation, a width of the terminal is greater than or equal to a width of the support section.

In a possible implementation, the width of the terminal is greater than or equal to 3.5 μm.

In a possible implementation, the electrode region has a first connection end at the via, the connection section has a second connection end at the via, and projection of the second connection end on the first surface is accommodated in the first connection end.

In a possible implementation, in a plane direction of the touch layer, a distance between an edge of the projection of the second connection end on the first surface and an edge of the first connection end is from 1 μm to 3 μm.

In a possible implementation, the electrode region includes a plurality of first electrodes, a plurality of second electrodes, and a plurality of conduction sections, the plurality of first electrodes are arranged in an array and staggered with the plurality of second electrodes, and the conduction section is connected between any two adjacent first electrodes in a first direction, to conduct the plurality of first electrodes in the first direction; and the connection section is connected between any two adjacent second electrodes in a second direction, to sequentially conduct the plurality of second electrodes in the second direction, where an included angle is between the first direction and the second direction.

In a possible implementation, the first electrode is a touch driving electrode, and the second electrode is a touch sensing electrode.

In a possible implementation, the first electrode is a touch sensing electrode, and the second electrode is a touch driving electrode.

In a possible implementation, the touchscreen further includes a non-bending region, the non-bending region is located on at least one side of the bending region, and the touch layer is further at least partially disposed in the non-bending region.

In a possible implementation, the non-bending region is located on two opposite sides of the bending region.

In a possible implementation, the touch layer completely covers the non-bending region.

In a possible implementation, the touchscreen further includes a flexible substrate and an organic coating layer, the touch layer is stacked between the flexible substrate and the organic coating layer, and the electrode sub-layer of the touch layer is disposed on a side that is of the insulation sub-layer and that is away from the flexible substrate.

In a possible implementation, the touchscreen further includes a buffer layer, and the buffer layer is connected between the flexible substrate and the connection sub-layer of the touch layer and is configured to relieve pressure on the touch layer.

According to a third aspect, the present disclosure further provides a touchscreen having a bending region. A touch layer is disposed in the bending region, a grid line is arranged at the touch layer, a plurality of channels for disconnecting the grid line are further disposed at the touch layer, the plurality of channels divide the grid line into a plurality of electrode regions, a grid line between any two adjacent electrode regions has a terminal at a channel, and a width of the terminal is greater than a width of the grid line.

On the touchscreen in the present disclosure, the grid line is also arranged at the touch layer, and the plurality of channels are disposed to disconnect the grid line, so that the grid line can be divided into the plurality of independent electrode regions, to implement a touch sensing and detection function of the touch layer through cooperation between the plurality of electrode regions, and enable the touchscreen to implement touch control effect.

On the touchscreen in the present disclosure, the width of the terminal is set to be greater than the width of the grid line, so that a stress bearing area at the terminal when the touchscreen is bent can be increased, and stress generated at the terminal when the touchscreen is bent can be further dispersed, to improve stress concentration at the terminal during bending, avoid a crack, a break, or the like of each film layer at the touch layer at the fracture, and improve use reliability and a service life of the touchscreen.

In a possible implementation, the width of the terminal is greater than or equal to 3.5 µm.

In this implementation, the width of the terminal is set to be greater than or equal to 3.5 µm, to increase a force-bearing area of the terminal, so as to disperse the stress generated at the terminal when the touchscreen is bent, thereby improving the stress concentration at the terminal during bending.

In a possible implementation, in a plane direction of the touch layer, a shape of a boundary at which the terminal is constructed as the fracture is an arc.

In a possible implementation, in the plane direction of the touch layer, the shape of the boundary at which the terminal is constructed as the fracture is a circular arc.

In a possible implementation, the touch layer includes an electrode sub-layer, an insulation sub-layer, and a connection sub-layer that are stacked, the electrode sub-layer is constructed as the grid line arranged on a first surface of the insulation sub-layer, the plurality of channels for disconnecting the grid line are further disposed at the electrode sub-layer, and the plurality of channels divide the grid line into the plurality of electrode regions; and the connection sub-layer is located on a second surface that is of the insulation sub-layer and that is away from the first surface, a plurality of connection sections are disposed at the connection sub-layer, a plurality of vias are disposed at the insulation sub-layer, and at least some of the electrode regions are sequentially conducted through the vias and the connection sections.

In a possible implementation, a plurality of support sections are disposed at the connection sub-layer, and in a length direction of each support section, projection of each support section on the first surface covers one fracture.

In a possible implementation, a length of the support section is greater than or equal to 4 µm.

In a possible implementation, the grid line has a terminal at the fracture, and the terminal is constructed as a boundary of the fracture; and one terminal has a first length L1, a length of an overlapping part between the projection of the support section on the first surface and the terminal is a second length L2, and the second length L2 is less than or equal to ½L1.

In a possible implementation, a width of the terminal is greater than or equal to a width of the support section.

In a possible implementation, the plurality of connection sections are disposed at the connection sub-layer, the plurality of vias are disposed at the insulation sub-layer, and the at least some of the electrode regions are sequentially conducted through the vias and the connection sections.

In a possible implementation, in a plane direction of the touch layer, a distance between an edge of projection of a second connection end on the first surface and an edge of a first connection end is from 1 µm to 3 µm.

In a possible implementation, the electrode region includes a plurality of first electrodes, a plurality of second electrodes, and a plurality of conduction sections, the plurality of first electrodes are arranged in an array and staggered with the plurality of second electrodes, and the conduction section is connected between any two adjacent first electrodes in a first direction, to conduct the plurality of first electrodes in the first direction; and the connection section is connected between any two adjacent second electrodes in a second direction, to sequentially conduct the plurality of second electrodes in the second direction, where an included angle is between the first direction and the second direction.

In a possible implementation, the first electrode is a touch driving electrode, and the second electrode is a touch sensing electrode.

In a possible implementation, the first electrode is a touch sensing electrode, and the second electrode is a touch driving electrode.

In a possible implementation, the touchscreen further includes a non-bending region, the non-bending region is located on at least one side of the bending region, and the touch layer is further at least partially disposed in the non-bending region.

In a possible implementation, the non-bending region is located on two opposite sides of the bending region.

In a possible implementation, the touch layer completely covers the non-bending region.

In a possible implementation, the touchscreen further includes a flexible substrate and an organic coating layer, the touch layer is stacked between the flexible substrate and the organic coating layer, and the electrode sub-layer of the touch layer is disposed on a side that is of the insulation sub-layer and that is away from the flexible substrate.

In a possible implementation, the touchscreen further includes a buffer layer, and the buffer layer is connected between the flexible substrate and the connection sub-layer of the touch layer and is configured to relieve pressure on the touch layer.

According to a fourth aspect, the present disclosure further provides a touchscreen having a bending region. A touch layer is disposed in the bending region, the touch layer includes an electrode sub-layer, an insulation sub-layer, and a connection sub-layer that are stacked, the electrode sub-layer is constructed as a grid line arranged on a first surface of the insulation sub-layer, a plurality of channels for disconnecting the grid line are further disposed at the electrode sub-layer, the plurality of channels divide the grid line into a plurality of electrode regions, a grid line between any two adjacent electrode regions forms a fracture at a channel, the connection sub-layer is located on a second surface that is of the insulation sub-layer and that is away from the first surface, a plurality of support sections are disposed at the connection sub-layer, and in a length direction of each support section, projection of each support section on the first surface covers one fracture.

On the touchscreen in the present disclosure, the electrode sub-layer is disposed to be constructed as the grid line arranged on the first surface of the insulation sub-layer, and the plurality of channels are disposed to disconnect the grid line, so that the grid line can be divided into the plurality of independent electrode regions, to implement a touch sensing and detection function of the touch layer through cooperation between the plurality of electrode regions, and enable the touchscreen to implement touch control effect.

On the touchscreen in the present disclosure, the support section is disposed, and in the length direction of each support section, the projection of each support section on the first surface is disposed to cover one fracture. In this way, the support section overlaps a terminal in a direction in which the electrode sub-layer is opposite to the insulation sub-layer, so that the support section functions as a reinforcing rib at the connection sub-layer, that is, a stress bearing capacity of the connection sub-layer at the fracture can be enhanced, and a crack, a break, or the like of the connection sub-layer at the fracture can be avoided, to improve use reliability and a service life of the touchscreen.

In a possible implementation, a length of the support section is greater than or equal to 4 μm.

In this implementation, the length of the support section is set to be greater than or equal to 4 μm, so that a stress bearing capacity of the support section can be ensured, to further improve the stress bearing capacity of the connection sub-layer at the fracture.

In a possible implementation, the grid line has a terminal at the fracture, and the terminal is constructed as a boundary of the fracture; and one terminal has a first length L1, a length of an overlapping part between the projection of the support section on the first surface and the terminal is a second length L2, and the second length L2 is less than or equal to ½L1.

In this implementation, the second length L2 of the overlapping part between the projection of the support section on the first surface and the terminal is set to be less than or equal to ½L1, so that an overlapping length between the support section and the terminal in the direction in which the electrode sub-layer is opposite to the insulation sub-layer can be ensured, to further ensure the stress bearing capacity of the support section.

In a possible implementation, a width of the terminal is greater than or equal to a width of the support section.

In this implementation, the width of the terminal is set to be greater than or equal to the width of the support section, so that the stress bearing capacity of the connection sub-layer during bending can be improved, and the support section does not affect light emission during display of an electronic device, to improve use effect and applicability of the touch layer.

In a possible implementation, a plurality of connection sections are further disposed at the connection sub-layer, a plurality of vias are disposed at the insulation sub-layer, and at least some of the electrode regions are sequentially conducted through the vias and the connection sections.

In this implementation, the plurality of connection sections are further disposed at the connection sub-layer, the plurality of vias are disposed at the insulation sub-layer, and effect of bridging is implemented at the connection sections through the vias, that is, the connection sections sequentially conduct the at least some of the electrode regions through the vias, so that the at least some of the electrode regions can be conducted to each other and implement functions thereof.

In a possible implementation, a width of the fracture is greater than or equal to 8 μm.

In a possible implementation, the grid line includes a plurality of first sub-grid lines that are parallel to each other and a plurality of second sub-grid lines that are parallel to each other, and any first sub-grid line intersects the plurality of second sub-grid lines to form a plurality of intersection parts; and the grid line has the terminal at the fracture, one end of the terminal communicates with the intersection part, the other end of the terminal is constructed as the boundary of the fracture, and a length of the terminal is from 0.5 μm to 3 μm.

In a possible implementation, the width of the terminal is greater than a width of the grid line.

In a possible implementation, the width of the terminal is greater than or equal to 3.5 μm.

In a possible implementation, in a plane direction of the touch layer, a shape of the boundary at which the terminal is constructed as the fracture is an arc.

In a possible implementation, in the plane direction of the touch layer, the shape of the boundary at which the terminal is constructed as the fracture is a circular arc.

In a possible implementation, each fracture is parallel to a bending central axis of the bending region.

In a possible implementation, the plurality of connection sections are further disposed at the connection sub-layer, the plurality of vias are disposed at the insulation sub-layer, and the at least some of the electrode regions are sequentially conducted through the vias and the connection sections.

In a possible implementation, the electrode region has a first connection end at the via, the connection section has a second connection end at the via, and projection of the second connection end on the first surface is accommodated in the first connection end.

In a possible implementation, in a plane direction of the touch layer, a distance between an edge of the projection of the second connection end on the first surface and an edge of the first connection end is from 1 μm to 3 μm.

In a possible implementation, the electrode region includes a plurality of first electrodes, a plurality of second electrodes, and a plurality of conduction sections, the plurality of first electrodes are arranged in an array and staggered with the plurality of second electrodes, and the conduction section is connected between any two adjacent first electrodes in a first direction, to conduct the plurality of first electrodes in the first direction; and the connection section is connected between any two adjacent second electrodes in a second direction, to sequentially conduct the plurality of second electrodes in the second direction, where an included angle is between the first direction and the second direction.

In a possible implementation, the first electrode is a touch driving electrode, and the second electrode is a touch sensing electrode.

In a possible implementation, the first electrode is a touch sensing electrode, and the second electrode is a touch driving electrode.

In a possible implementation, the touchscreen further includes a non-bending region, the non-bending region is located on at least one side of the bending region, and the touch layer is further at least partially disposed in the non-bending region.

In a possible implementation, the non-bending region is located on two opposite sides of the bending region.

In a possible implementation, the touch layer completely covers the non-bending region.

In a possible implementation, the touchscreen further includes a flexible substrate and an organic coating layer, the touch layer is stacked between the flexible substrate and the organic coating layer, and the electrode sub-layer of the touch layer is disposed on a side that is of the insulation sub-layer and that is away from the flexible substrate.

In a possible implementation, the touchscreen further includes a buffer layer, and the buffer layer is connected between the flexible substrate and the connection sub-layer of the touch layer and is configured to relieve pressure on the touch layer.

According to a fifth aspect, the present disclosure further provides a touchscreen having a bending region. A touch layer is disposed in the bending region, the touch layer includes an electrode sub-layer, an insulation sub-layer, and a connection sub-layer that are stacked, the electrode sub-layer is constructed as a grid line arranged on a first surface of the insulation sub-layer, a plurality of channels for disconnecting the grid line are further disposed at the electrode sub-layer, the plurality of channels divide the grid line into a plurality of electrode regions, the connection sub-layer is located on a second surface that is of the insulation sub-layer and that is away from the first surface, a plurality of connection sections are disposed at the connection sub-layer, a plurality of vias are disposed at the insulation sub-layer, at least some of the electrode regions are sequentially conducted through the vias and the connection sections, the electrode region has a first connection end at the via, the connection section has a second connection end at the via, and projection of the second connection end on the first surface is accommodated in the first connection end.

On the touchscreen in the present disclosure, the electrode sub-layer is also disposed to be constructed as the grid line arranged on the first surface of the insulation sub-layer, and the plurality of channels are disposed to disconnect the grid line, so that the grid line can be divided into the plurality of independent electrode regions, to implement a touch sensing and detection function of the touch layer through cooperation between the plurality of electrode regions, and enable the touchscreen to implement touch control effect.

On the touchscreen in the present disclosure, the projection of the second connection end on the first surface is disposed to be accommodated in the first connection end, to increase a stress bearing area of the grid line, thereby avoiding stress concentration at the first connection end and avoiding a crack, a break, or the like of each film layer at the touch layer at a fracture, so as to improve use reliability and a service life of the touchscreen.

In a possible implementation, in a plane direction of the touch layer, a distance between an edge of the projection of the second connection end on the first surface and an edge of the first connection end is from 1 μm to 3 μm.

In this implementation, the distance between the edge of the projection of the second connection end on the first surface and the edge of the first connection end is set to 1 μm to 3 μm, so that a stress bearing area of the first connection end can be ensured, and impact of the first connection end on light emission during display of an electronic device can be avoided, to improve use effect and applicability of the touch layer.

In a possible implementation, a width of the fracture is greater than or equal to 8 μm.

In a possible implementation, the grid line includes a plurality of first sub-grid lines that are parallel to each other and a plurality of second sub-grid lines that are parallel to each other, and any first sub-grid line intersects the plurality of second sub-grid lines to form a plurality of intersection parts; and the grid line has a terminal at the fracture, one end of the terminal communicates with the intersection part, the other end of the terminal is constructed as a boundary of the fracture, and a length of the terminal is from 0.5 μm to 3 μm.

In a possible implementation, the width of the terminal is greater than a width of the grid line.

In a possible implementation, the width of the terminal is greater than or equal to 3.5 μm.

In a possible implementation, in a plane direction of the touch layer, a shape of the boundary at which the terminal is constructed as the fracture is an arc.

In a possible implementation, in the plane direction of the touch layer, the shape of the boundary at which the terminal is constructed as the fracture is a circular arc.

In a possible implementation, each fracture is parallel to a bending central axis of the bending region.

In a possible implementation, a plurality of support sections are disposed at the connection sub-layer, and in a length direction of each support section, projection of each support section on the first surface covers one fracture.

In a possible implementation, a length of the support section is greater than or equal to 4 μm.

In a possible implementation, the grid line has the terminal at the fracture, and the terminal is constructed as the boundary of the fracture; and one terminal has a first length L1, a length of an overlapping part between the projection of the support section on the first surface and the terminal is a second length L2, and the second length L2 is less than or equal to ½L1.

In a possible implementation, the width of the terminal is greater than or equal to a width of the support section.

In a possible implementation, the electrode region includes a plurality of first electrodes, a plurality of second electrodes, and a plurality of conduction sections, the plurality of first electrodes are arranged in an array and staggered with the plurality of second electrodes, and the conduction section is connected between any two adjacent first electrodes in a first direction, to conduct the plurality of first electrodes in the first direction; and the connection section is connected between any two adjacent second electrodes in a second direction, to sequentially conduct the plurality of second electrodes in the second direction, where an included angle is between the first direction and the second direction.

In a possible implementation, the first electrode is a touch driving electrode, and the second electrode is a touch sensing electrode.

In a possible implementation, the first electrode is a touch sensing electrode, and the second electrode is a touch driving electrode.

In a possible implementation, the touchscreen further includes a non-bending region, the non-bending region is located on at least one side of the bending region, and the touch layer is further at least partially disposed in the non-bending region.

In a possible implementation, the non-bending region is located on two opposite sides of the bending region.

In a possible implementation, the touch layer completely covers the non-bending region.

In a possible implementation, the touchscreen further includes a flexible substrate and an organic coating layer, the touch layer is stacked between the flexible substrate and the organic coating layer, and the electrode sub-layer of the touch layer is disposed on a side that is of the insulation sub-layer and that is away from the flexible substrate.

In a possible implementation, the touchscreen further includes a buffer layer, and the buffer layer is connected between the flexible substrate and the connection sub-layer of the touch layer and is configured to relieve pressure on the touch layer.

According to a sixth aspect, the present disclosure provides an electronic device, including a housing and the touchscreen according to any one of the first aspect to the fifth aspect of the present disclosure, where the touchscreen is fastened to the housing.

It may be understood that the electronic device provided in the present disclosure implements a touch control function via the touchscreen. The electronic device cooperates with the touchscreen according to the first aspect to the fifth aspect of the present disclosure, to reduce stress concentration of each film layer structure when the touchscreen is bent and avoid a possible break or crack of each film layer when the touchscreen is bent, thereby ensuring use reliability and user experience of the electronic device in the present disclosure. In other words, because the electronic device provided in the present disclosure uses the touchscreen according to any one of the first aspect to the fifth aspect, the electronic device provided in the present disclosure has all possible beneficial effect of the touchscreen according to any one of the foregoing aspects.

BRIEF DESCRIPTION OF DRAWINGS

To describe technical solutions in the present disclosure more clearly, the following briefly describes accompanying drawings used in describing the implementations. It is clear that the accompanying drawings in the following descriptions show merely some implementations of the present disclosure, and a person of ordinary skill in the art may still derive other drawings from these accompanying drawings without creative efforts.

DESCRIPTION OF EMBODIMENTS

The following describes technical solutions in embodiments of the present disclosure with reference to accompanying drawings in embodiments of the present disclosure. It is clear that the described embodiments are merely some but not all of embodiments of the present disclosure. All other embodiments obtained by a person of ordinary skill in the art based on embodiments of the present disclosure without creative efforts shall fall within the protection scope of the present disclosure.

Figure 1:
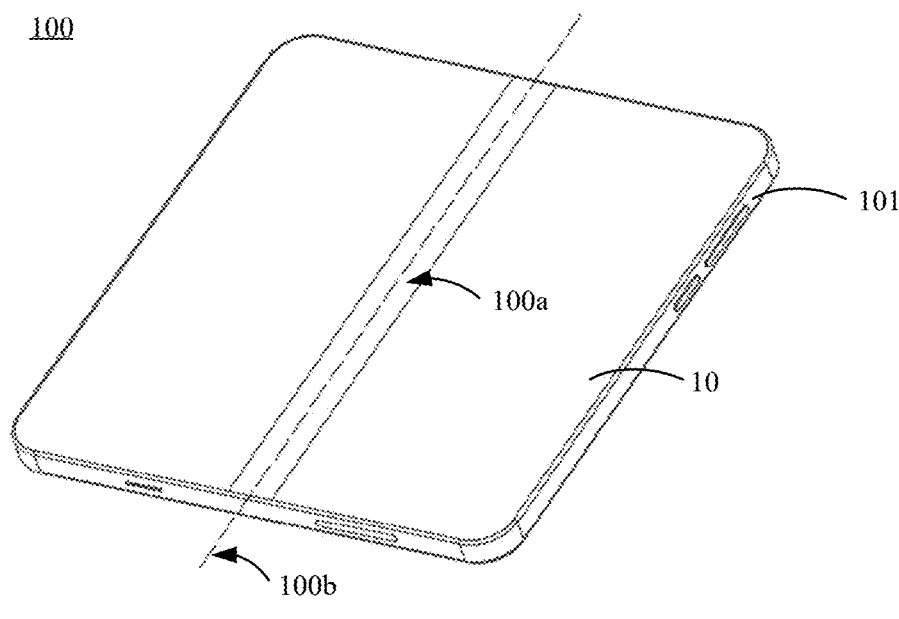
FIG. 1 is a diagram of a structure of a perspective of an electronic device in an implementation according to the present disclosure.
Figure 2:
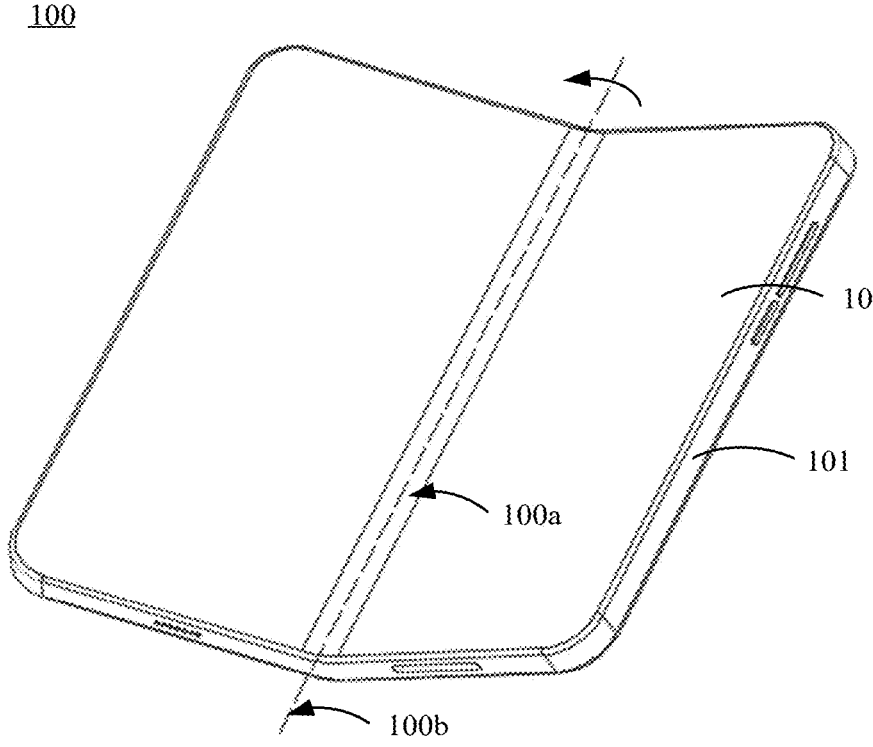
FIG. 2 is a diagram of a structure of a perspective of an electronic device in another implementation according to the present disclosure.

Refer to both FIG. 1 and FIG. 2. FIG. 1 is a diagram of a structure of a perspective of an electronic device 100 in an implementation according to the present disclosure, and FIG. 2 is a diagram of a structure of a perspective of the electronic device 100 in another implementation according to the present disclosure. The present disclosure provides the electronic device 100. The electronic device 100 in the present disclosure may implement effect of folding and curving. The electronic device 100 includes a housing 101 and a touchscreen 10, and the touchscreen 10 is fastened to the housing 101.

The touchscreen 10 is configured to implement touch sensing, detection, and image display functions of the electronic device 100 in the present disclosure.

The housing 101 is configured to support, fasten, and protect the touchscreen 10, so that the touchscreen 10 fastened to the housing 101 can normally implement the touch detection and sensing functions of the touchscreen 10.

In addition, the housing 101 can further fasten and protect the touchscreen 10 and another electronic component or structure disposed inside the housing 101 under external force, for example, in a case of dropping or bumping. In addition, the touchscreen 10 and the another electronic component or structure disposed inside the housing 101 can be sealed, to prevent impurities such as external water vapor and dust from eroding the electronic component or structure disposed inside the housing 101.

In a possible implementation, as shown in FIG. 1, the touchscreen 10 may be exposed outwards from one side of the housing 101, to implement the touch sensing, detection, and image display functions.

In some possible implementations, the touchscreen 10 may alternatively be disposed inside the housing 101, and a side that is of housing 101 and that is close to an image display surface of the touchscreen 10 may be disposed as a transparent structure, so that the touchscreen 10 is protected, and the touchscreen 10 can normally implement the function of the touchscreen 10.

It should be noted that, in the implementation of the present disclosure, only an example in which the electronic device 100 is a mobile phone is used for description, and the electronic device 100 in the present disclosure is not limited to be only the mobile phone. In another implementation of the present disclosure, the electronic device 100 may alternatively be a tablet computer, a television, a notebook computer, an intelligent wearable device (for example, a smartwatch or a smart band), or another electronic product having touch control and display functions. This is not specifically limited in the present disclosure.

As shown in FIG. 2, the electronic device 100 has a bending region 100a, and there is a bending central axis 100b in the bending region 100a. It may be understood that the foldable electronic device 100 may be bent, curved, or folded around the bending central axis 100b.

At least some structures that are of the housing 101, the touchscreen 10, and other structures or components such as a substrate and a display of the electronic device 100 and that are located in the bending region 100a are flexible, so that the structures can be bent, curved, or folded, thereby implementing bending, curving, or folding of the electronic device 100 while implementing a normal function of the electronic device 100, to improve user experience of using the electronic device 100 in the present disclosure, and improve convenience of carrying the electronic device 100 in the present disclosure.

It should be noted that FIG. 2 merely describes positions, structures, and areas of the bending region 100a and the bending central axis 100b of the electronic device 100 by using examples, and this does not indicate actual positions, structures, and areas of the bending region 100a and the bending center axis 100b when the electronic device 100 is bent. In other words, in a bending process of the electronic device 100, the actual positions, the structures, and the areas of the bending region 100a and the bending central axis 100b may be adjusted based on actual requirements.

For example, in a possible implementation, the bending region 100a may further completely cover the entire electronic device 100, that is, the electronic device 100 may be in a reel form.

For example, in a possible implementation, the bending region 100a may further partially cover the electronic device 100. In other words, both an arrangement position of the bending region 100a and an arrangement quantity of bending regions 100a may be adjusted. In FIG. 2, only an example in which there is one bending region 100a of the electronic device 100 is used for description. In another implementation of the present disclosure, there may alternatively be a plurality of bending regions 100a, for example, two or three bending regions 100a. In other words, the electronic device 100 may further implement effect like double folding and triple folding.

In a possible implementation, other structures configured to implement the function of the electronic device 100, for example, a battery (not shown in the figure) and a circuit board (not shown in the figure), may be further disposed inside the housing 101.

It may be understood that the battery may be used as a power supply apparatus of the electronic device 100, that is, disposed inside the housing 101 as a power supply of the electronic device 100. The battery may be configured to provide electric energy for the electronic device 100 to implement the normal function of the electronic device 100. The circuit board may be electrically connected to electronic structures, components, or the like in the electronic device 100, to receive or transmit various signals, so as to control the electronic structures or components to work cooperatively and jointly implement the functions of the electronic device 100.

Figure 3:
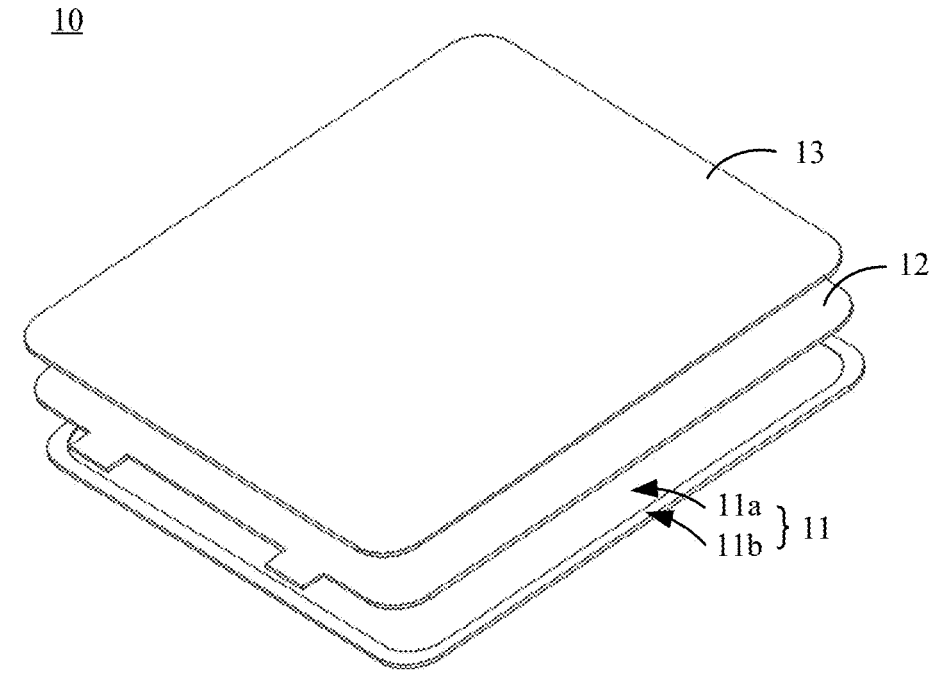
FIG. 3 is a diagram of an exploded structure of a touchscreen in the implementation shown in FIG. 1.

FIG. 3 is a diagram of an exploded structure of the touchscreen 10 in the implementation shown in FIG. 1. In the implementation shown in FIG. 3, the touchscreen 10 includes a display layer 11, a touch layer 12, and a protective layer 13 that are sequentially stacked, that is, the touch layer 12 is sandwiched between the display layer 11 and the protective layer 13. In addition, both the touch layer 12 and the protective layer 13 are located on a light-emitting side of the display layer 11.

The display layer 11, the touch layer 12, and the protective layer 13 may be connected through adhesive or in another connection manner. This is not limited in the present disclosure.

The protective layer 13 is made of a flexible and light transmission material and is configured to package and protect the touch layer 12, the display layer 11, and the another electronic structure disposed in the touchscreen 10, to prevent the impurities such as external water vapor and the dust from eroding the touchscreen 10 and affecting use effect and user experience of the touchscreen 10.

In the implementation shown in FIG. 3, only a structural size and a position of the protective layer 13 are used as examples for description, and this does not indicate an actual structure and structural size of the protective layer 13. For example, an actual thickness of the protective layer 13 may be adjusted based on a design requirement of the electronic device 100.

It may be understood that, by disposing the protective layer 13 as the flexible material, when the electronic device 100 is curved or folded, at least a part of the structure of the protective layer 13 can be folded as the electronic device 100 is bent. The protective layer 13 is made of the light transmission material, so that light used by the display layer 11 to display an image or control an interface can pass through the protective layer 13 and be emitted outwards, to form visible effect of the electronic device 100.

The display layer 11 is configured to implement functions such as the image display of the electronic device 100.

In a possible implementation, as shown in FIG. 3, the display layer 11 may include a display region 11a and a non-display region 11b. The non-display region 11b is disposed around a periphery of the display region 11a.

Specifically, in a possible implementation, as shown in FIG. 3, a plurality of subpixels (not shown in the figure)

configured to display an image may be disposed in the display region 11a, and cables that are electrically connected to the subpixels and that are configured to provide drive signals for the subpixels may be arranged, for example, a plurality of scanning lines and a plurality of data lines.

Drive circuits such as scanning drive circuits or data drive circuits electrically connected to the subpixels may be arranged in the non-display region 11b, to control the subpixels to work through the cables electrically connected to the subpixels, so that the display layer 11 emits light outwards and implements image display effect.

It should be noted that, in the implementation shown in FIG. 3, an example in which the display region 11a and the non-display region 11b of the display layer 11 are located at a same layer is used to describe the function and the like of the display layer 11. However, the display region 11a and the non-display region 11b are not limited to be on a same side of the display layer 11.

In another implementation of the present disclosure, the non-display region 11b of the display layer 11 may be further located in another position on the touchscreen 10, so that effect of narrow-bezel display, bezel-less display, or full-screen display on the touchscreen 10 can be implemented, to further improve a screen-to-body ratio of the touchscreen 10.

The display layer 11 is a flexible display layer, so that when the electronic device 100 is curved or folded, the display layer 11 may be folded as the electronic device 100 is bent, so that bending effect can be formed while a function of displaying an image or an operation interface of the electronic device 100 is implemented.

It should be noted that the display layer 11 in the electronic device 100 in the present disclosure may be a liquid crystal display layer, an organic electroluminescent display layer, a quantum dot electroluminescent display layer, or another display layer that can be configured to implement the image display function of the touchscreen 10. This is not specifically limited in this implementation of the present disclosure.

The touch layer 12 may cooperate with the display layer 11, to implement the touch sensing, detection, and image display functions of the touchscreen 10. Further, a function like receiving an external input instruction or outputting feedback information to the outside by the electronic device 100 can be implemented, to form man-machine interaction effect between the electronic device 100 and a user (namely, an operator of the electronic device 100).

For example, in a possible implementation, the display layer 11 may be configured to display an operation interface, and the user may touch the touch layer 12 with a finger, by using a stylus, or the like, to cause an electrical signal change inside the touch layer 12, so as to implement effect like selecting a to-be-displayed instruction and controlling the operation interface.

The touchscreen 10 may be a self-capacitance touchscreen, a mutual-capacitance touchscreen, or a touchscreen of another structure.

In an implementation of the present disclosure, an example in which the touchscreen 10 is a mutual-capacitive touchscreen is used for description. However, the structure of the touchscreen 10 in the electronic device 100 in the present disclosure is not limited thereto. In another embodiment of the present disclosure, the touchscreen 10 may alternatively be another touchscreen that can implement the touch sensing and detection effect.

In addition, a position in which the touchscreen 10 is disposed in the electronic device 100 may also be adjusted based on an actual design requirement. In FIG. 3, only one possible implementation is used as an example for description, and the touchscreen 10 is not limited to be only the implementation shown in FIG. 3.

Figure 4:
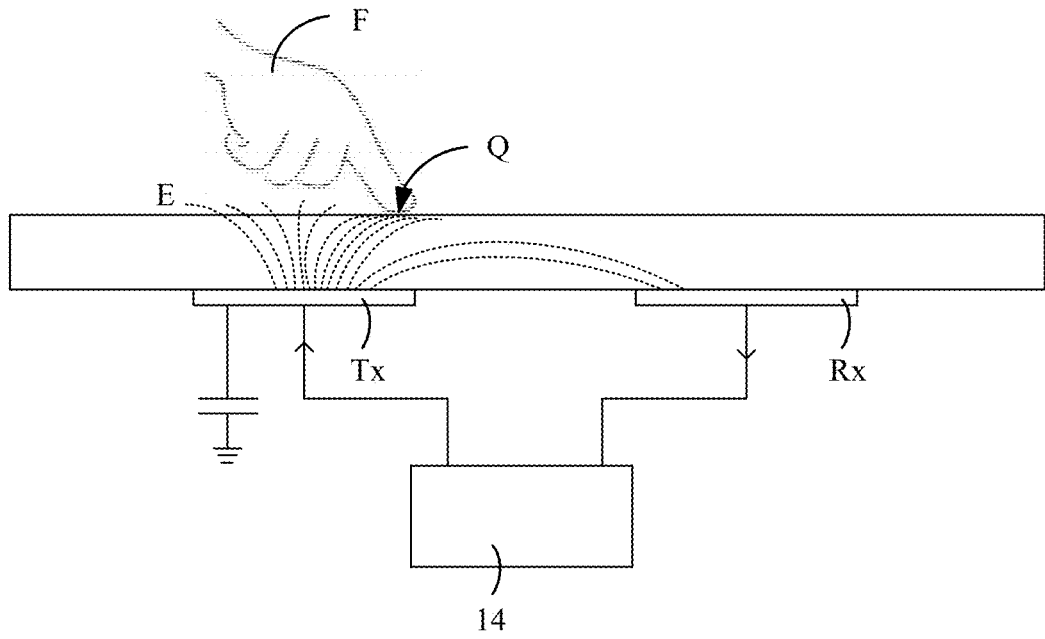
FIG. 4 is a diagram of a working principle of a touch layer.

FIG. 4 is a diagram of a working principle of the touch layer 12. In an implementation shown in FIG. 4, an example in which the touchscreen 10 is a mutual-capacitive touch structure is used to describe the working principle of the touch layer 12 in the electronic device 100 in the present disclosure.

Figure 5:
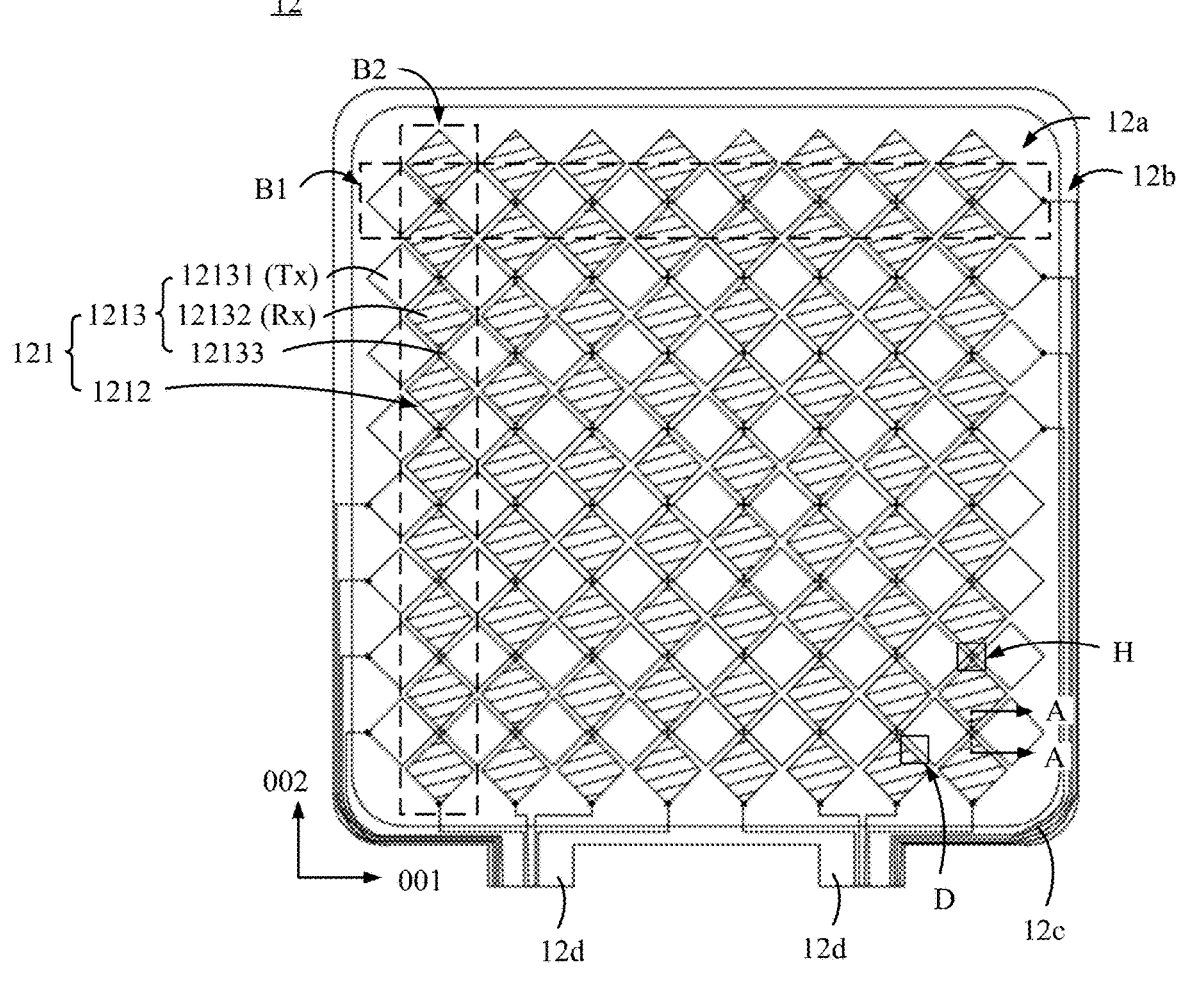
FIG. 5 is a diagram of a planar structure of a touch layer of a touchscreen of an electronic device in a possible implementation according to the present disclosure.

As shown in FIG. 4, the mutual-capacitive touch structure includes a plurality of touch driving electrodes Tx and a plurality of touch sensing electrodes Rx that respectively extend in different directions, and the plurality of touch driving electrodes Tx and the plurality of touch sensing electrodes Rx are arranged in a staggered manner (refer to FIG. 5 together).

For example, in an implementation, the touch driving electrodes Tx may be sequentially communicated in a vertical direction (a second direction 002 shown in FIG. 5), and the touch sensing electrodes Rx may be sequentially communicated in a horizontal direction (a first direction 001 shown in FIG. 5).

The touch driving electrodes Tx and the touch sensing electrodes Rx are all in communication with a touch drive circuit 14, a touch drive signal is applied to each of the touch driving electrodes Tx, and an electric field line E that can be received by the touch sensing electrode Rx is generated, to form a coupling capacitor between any touch driving electrode Tx and a touch sensing electrode Rx adjacent to the touch driving electrode Tx. It may be understood that one touch driving electrode Tx and one touch sensing electrode Rx that form the coupling capacitor are respectively constructed as two poles of the coupling capacitor.

When a finger F of a human body touches the touchscreen 10, for example, touches the protective layer 13 stacked on the touchscreen 10, a value of a coupling capacitor between two electrodes near a touch point Q is changed, that is, a capacitance between the two electrodes is changed, so that a sensing signal received by the touch sensing electrode Rx changes, for example, the electric field line E received by the touch sensing electrode Rx decreases.

The touch drive circuit 14 obtains a value of each coupling capacitor based on the touch sensing electrode Rx, and calculates a position of the touch point Q based on detected change data of the value of the coupling capacitor, to form the touch sensing and detection functions of the touchscreen 10.

FIG. 4 shows only effect of changing the value of the coupling capacitor with the finger F. In another implementation, effect of changing the value of the coupling capacitor may alternatively be implemented by using another conductor, for example, a stylus.

Figure 6:
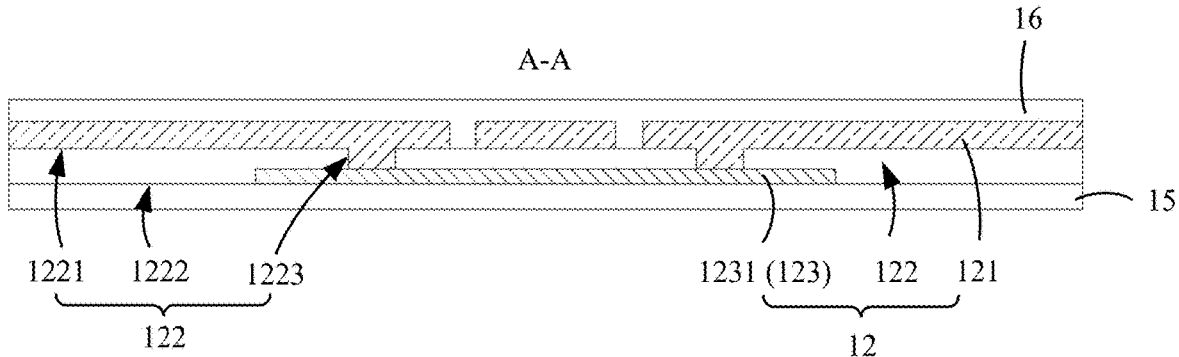
FIG. 6 is a diagram of a sectional structure of the touch layer in a position A-A in the implementation shown in FIG. 5.

Further, refer to both FIG. 5 and FIG. 6. FIG. 5 is a diagram of a planar structure of the touch layer 12 of the electronic device 100 in a possible implementation according to the present disclosure, and FIG. 6 is a diagram of a sectional structure of the touch layer 12 in a position A-A in the implementation shown in FIG. 5. The touch layer 12 is configured to implement the touch sensing and detection functions of the touchscreen 10. In the implementation shown in FIG. 5, the touch layer 12 may include a detection region 12a and a cabling region 12b, and the cabling region 12b is disposed around a periphery of the detection region 12a.

It should be noted that, in the implementation shown in FIG. 5, only an example in which the cabling region 12b is disposed around the periphery of the detection region 12a is used to describe the cabling region 12b. In another implementation of the present disclosure, an actual arrangement position of the cabling region 12b may be adjusted based on an actual design requirement. This is not specifically limited in the present disclosure.

Further, the detection region 12a is disposed corresponding to the display region 11a of the display layer 11, so that the light emitted by the display layer 11 in the display region 11a for displaying an image can pass through the detection region 12a and be emitted.

The cabling region 12b is disposed corresponding to the non-display region 11b of the display layer 11, to arrange a plurality of connection lines 12c and control chips 12d.

It may be understood that the connection line 12c may implement an electrical connection between each electronic structure or component in the detection region 12a and the control chip 12d, and can implement signal transmission effect. The control chip 12d may apply a control signal to each electronic structure or component located in the detection region 12a, or may receive a feedback signal from each electronic structure or component, to control cooperative work between the electronic structures or components, thereby implementing the touch sensing and detection functions of the touch layer 12.

It should be noted that, in the implementation shown in FIG. 5, only one possible implementation is used as an example to describe structures, arrangement positions, and arrangement manners of the connection line 12c and the control chip 12d, and structures, arrangement positions, arrangement manners, and the like of the connection line 12c and the control chip 12d in an actual design are not limited. In other words, in another implementation of the present disclosure, actual structures, arrangement positions, arrangement manners, arrangement quantities, and the like of the connection line 12c and the control chip 12d may be adjusted based on an actual design requirement.

For example, in a possible implementation, one control chip 12d may alternatively be arranged.

In addition, arrangement areas of the detection region 12a and the cabling region 12b may also be adjusted based on an actual requirement. In FIG. 5, only one possible implementation is used as an example to describe structures, positions, and the like of the detection region 12a and the cabling region 12b.

It may be understood that when the finger F of the human body touches the detection region 12a of the touch layer 12, the touch layer 12 can sense and detect the position of the touch point Q formed between the finger F and the touchscreen 10, to implement the touch sensing and detection effect.

As shown in FIG. 6, the touch layer 12 includes an electrode sub-layer 121, an insulation sub-layer 122, and a connection sub-layer 123 that are stacked. The insulation sub-layer 122 includes a first surface 1221 and a second surface 1222 that face away from each other and is connected between the electrode sub-layer 121 and the connection sub-layer 123, to space the electrode sub-layer 121 and the connection sub-layer 123 apart from each other, so as to avoid line crosstalk. In the implementation shown in FIG. 6, the electrode sub-layer 121 is connected to the first surface 1221 of the insulation sub-layer 122, and the connection sub-layer 123 is connected to the second surface 1222 of the insulation sub-layer 122.

A material of the insulation sub-layer 122 may be a dense inert material like silicon nitride or silicon oxide, to implement electrical isolation between different film layers and isolation of the film layers from an external environment.

Still refer to FIG. 5. In the implementation shown in FIG. 5, the electrode sub-layer 121 is constructed as a grid line 1211 (refer to FIG. 8) arranged on the first surface 1221 of the insulation sub-layer 122. A plurality of channels 1212 for disconnecting the grid line 1211 are further disposed at the electrode sub-layer 121, and the plurality of channels 1212 divide the grid line 1211 into a plurality of electrode regions 1213.

A structural size, an arrangement position, and the like of the channel 1212 may be adjusted based on an actual requirement. In the implementation shown in FIG. 5, only one possible implementation of the channel 1212 is used as an example for description, and a structural feature of the channel for dividing the grid line 1211 into the plurality of independent electrode regions 1213 on the touchscreen 10 provided in the present disclosure is not limited thereto.

It may be understood that the grid line 1211 is disconnected by disposing the plurality of channels 1212, to form the plurality of independent electrode regions 1213 through division, so that the electrode regions 1213 can be independent and implement different functions, and the plurality of electrode regions 1213 cooperate with each other to implement the touch sensing and detection functions of the touch layer 12.

As shown in FIG. 5, in a plane direction of the electrode sub-layer 121, a shape of each electrode region 1213 may be a rhombus.

It should be noted that, in the implementation shown in FIG. 5, only one possible implementation of the electrode region 1213 is used as an example to describe the electrode region 1213, and an actual structural shape and a structural size of the electrode region 1213 are not limited. In other words, in an actual design requirement of the electrode region 1213, the structural shape and the structural size of the electrode region 1213 may be adjusted based on the actual design requirement. This is not specifically limited in the present disclosure.

The electrode region 1213 includes a plurality of first electrodes 12131, a plurality of second electrodes 12132, and a plurality of conduction sections 12133. The plurality of first electrodes 12131 are arranged in an array and staggered with the plurality of second electrodes 12132.

The conduction section 12133 is connected between any two adjacent first electrodes 12131 in the first direction 001, to conduct the plurality of first electrodes 12131 in the first direction 001.

A connection section 1231 (refer to FIG. 6) is connected between any two adjacent second electrodes 12132 in the second direction 002, to sequentially conduct the plurality of second electrodes 12132 in the second direction 002, where an included angle is between the first direction 001 and the second direction 002.

In other words, in the implementation shown in FIG. 5, the electrode region 1213 includes a plurality of first electrode groups B1 and a plurality of second electrode groups B2. The plurality of first electrode groups B1 are sequentially spaced in the second direction 002 and are parallel to each other. The plurality of second electrode groups B2 are sequentially spaced in the first direction 001 and are parallel to each other.

Each first electrode group B1 includes the plurality of first electrodes 12131, the plurality of first electrodes 12131 are sequentially spaced in the first direction 001, and the conduction section 12133 is located between the any two adjacent first electrodes 12131 in the first direction 001, to separately conduct each first electrode 12131 in each first electrode group B1 in the first direction.

Each second electrode group B2 includes the plurality of second electrodes 12132, and the plurality of second electrodes 12132 are sequentially spaced in the second direction 002. The connection section 1231 is located between the any two adjacent second electrodes 12132 in the second direction 002, to separately conduct each second electrode 12132 in each second electrode group B2 in the second direction 002.

In the implementation shown in FIG. 5, the first direction 001 and the second direction 002 are perpendicular to each other.

The first electrode 12131 may be constructed as the touch driving electrode Tx, and the second electrode 12132 may be constructed as the touch sensing electrode Rx.

It may be understood that, in this implementation, the first electrode 12131 is constructed as the touch driving electrode Tx, and the second electrode 12132 is constructed as the touch sensing electrode Rx, so that the first electrode 12131 can implement the function of the touch driving electrode Tx, and the second electrode 12132 can implement the function of the touch sensing electrode Rx. In addition, the touch sensing and detection functions of the touch layer 12 can be implemented through mutual cooperation between the first electrode 12131 and the second electrode 12132.

It should be noted that, in FIG. 5, only an example in which the first electrode 12131 is constructed as the touch driving electrode Tx and the second electrode 12132 is constructed as the touch sensing electrode Rx is used to describe structures and arrangement manners of the first electrode 12131 and the second electrode 12132, and actual structures and arrangement manners of the first electrode 12131 and the second electrode 12132 are not limited.

In other words, in another implementation of the present disclosure, actual structures and arrangement manners of the first electrode 12131 and the second electrode 12132 may be adjusted based on an actual requirement. This is not limited in the present disclosure.

For example, in a possible implementation, the first electrode 12131 may be constructed as the touch sensing electrode Rx, and the second electrode 12132 may be constructed as the touch driving electrode Tx.

Still refer to FIG. 6. In the implementation shown in FIG. 6, the connection sub-layer 123 is located on the second surface 1222 of the insulation sub-layer 122, a plurality of connection sections 1231 are disposed at the connection sub-layer 123, a plurality of vias 1223 are disposed at the insulation sub-layer 122, and at least some of the electrode regions 1213 are sequentially conducted through the vias 1223 and the connection sections 1231. In other words, the connection section 1231 can sequentially conduct the second electrodes 12132 in the second direction 002 through the via 1223. In other words, the connection section 1231 can cooperate with the via 1223 in the second direction 002, to implement effect of bridging and communication between any two adjacent second electrodes 12132.

As shown in FIG. 6, the touch layer 12 further includes a flexible substrate 15 and an organic coating (Over Coating, OC) layer 16. The touch layer 12 is stacked between the flexible substrate 15 and the organic coating layer 16. The electrode sub-layer 121 of the touch layer 12 is disposed on a side that is of the insulation sub-layer 122 and that is away from the flexible substrate 15. The flexible substrate 15, the touch layer 12, and the organic coating layer 16 are sequentially stacked, and the organic coating layer 16 is located on a side that is of the touch layer 12 and that is away from the display layer 11.

In some possible implementations, the organic coating layer 16 may be connected between the touch layer 12 and the protective layer 13.

The flexible substrate 15 may be made of a flexible material and is configured to make and carry the touch layer 12, the organic coating layer 16, another film layer structure, or the like that is stacked on a surface of a side of the flexible substrate 15. In this way, normal use and function implementation of the touch layer 12 can be ensured.

The organic coating layer 16 can package and protect the touch layer 12, to avoid that normal use of the touchscreen 10 is affected because of the erosion of each film layer structure or the another electronic structure in the touchscreen 10 by the external dust and water vapor or the like.

Figure 7:
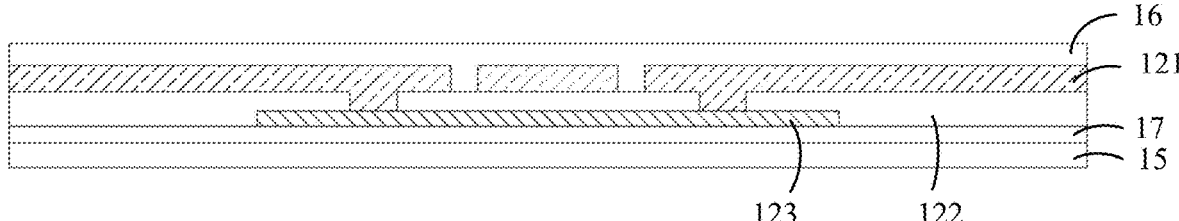
FIG. 7 is a diagram of a sectional structure of a perspective of a touch layer in a possible implementation.

In a possible implementation, FIG. 7 is a diagram of a sectional structure of a perspective of the touch layer 12 in a possible implementation. In the implementation shown in FIG. 7, the touchscreen 10 further includes a buffer layer 17, and the buffer layer 17 is connected between the flexible substrate 15 and the connection sub-layer 123 of the touch layer 12 and is configured to relieve pressure on the touch layer 12.

It may be understood that, in this implementation, the buffer layer 17 is disposed between the flexible substrate 15 and the connection sub-layer 123 of the touch layer 12, so that the buffer layer 17 can relieve the pressure on the touch layer 12, and further protect each film layer at the touch layer 12.

Figure 8:
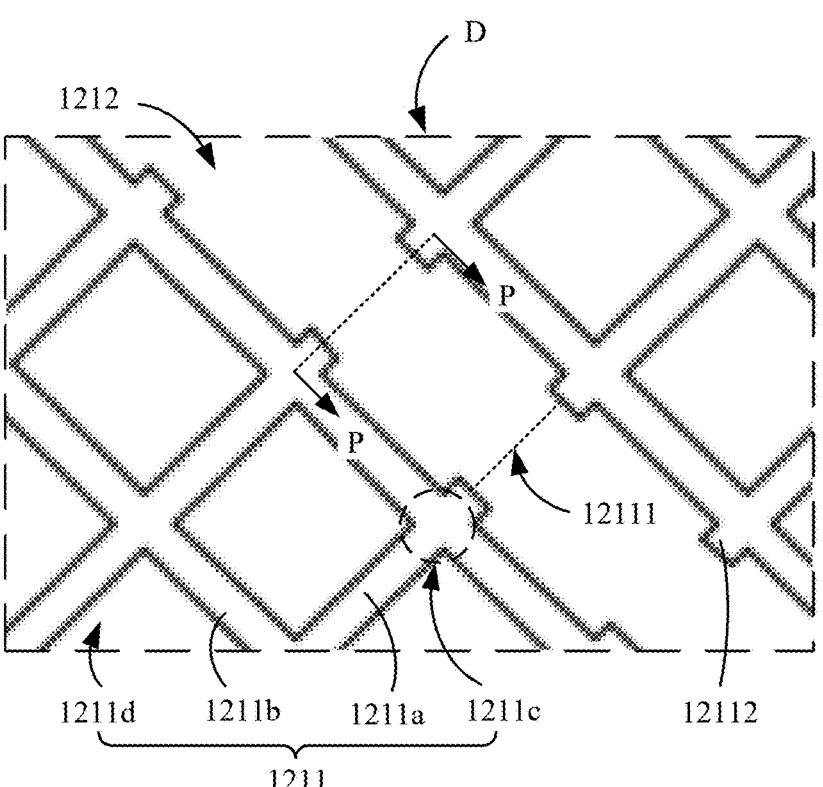
FIG. 8 is an enlarged diagram of a partial structure of the touch layer in a position D in the implementation shown in FIG. 5.
Figure 9:
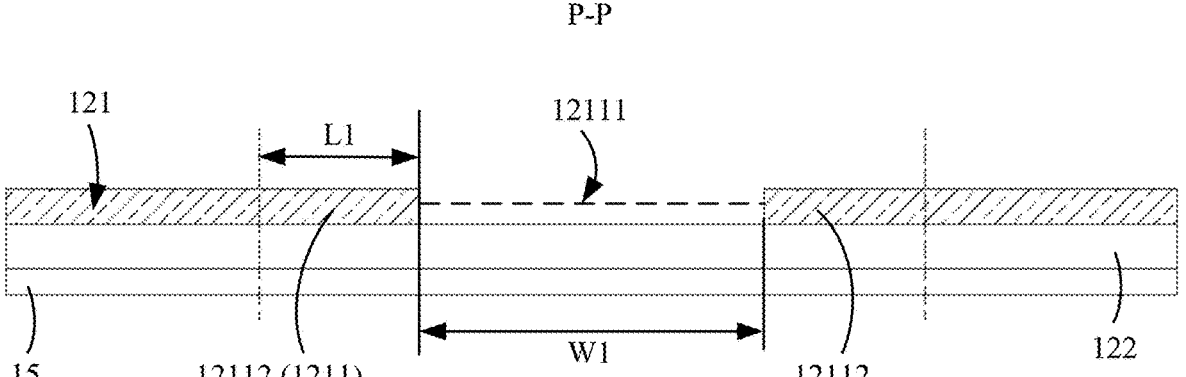
FIG. 9 is a diagram of a sectional structure in a position P-P in the embodiment shown in FIG. 8.

Refer to both FIG. 8 and FIG. 9. FIG. 8 is an enlarged diagram of a partial structure of the touch layer 12 in a position D in the implementation shown in FIG. 5, and FIG. 9 is a diagram of a sectional structure in a position P-P in the embodiment shown in FIG. 8. In the implementation shown in FIG. 8, the grid line 1211 includes a plurality of first sub-grid lines 1211a and a plurality of second sub-grid lines 1211b, the plurality of first sub-grid lines 1211a are arranged in parallel to each other, the plurality of second sub-grid lines 1211b are arranged in parallel to each other, and any first sub-grid line 1211a intersects the plurality of second sub-grid lines 1211b to form a plurality of intersection parts 1211c and a plurality of grid openings 1211d.

The intersection parts 1211c are arranged in an array and staggered with the grid openings 1211d, to form a grid structure. The light emitted by the display layer 11 may be emitted outwards from the grid opening 1211d, so that the grid line 1211 located in a light-emitting direction of the display layer 11 can be prevented from blocking the light that is emitted by the display layer 11 and that is used to display an image.

It may be understood that the plurality of first sub-grid lines 1211a that are parallel to each other and the plurality of second sub-grid lines 1211b that are parallel to each other are disposed, and the any first sub-grid line 1211a is disposed to intersect the plurality of second sub-grid lines 1211b, so that the first sub-grid line 1211a and the second sub-grid line 1211b can form the grid structure. In this way, the light emission during display of the display layer 11 is not affected while a normal function of each electrode region 1213 can be ensured.

In other words, the first sub-grid line 1211a and the second sub-grid line 1211b are disposed to intersect to form the grid structure, so that a light-emitting rate and light-emitting effect of the display layer 11 can be ensured while the touch sensing and detection functions of the touch layer 12 is implemented.

It should be noted that, in the implementation shown in FIG. 8, only one possible implementation of the grid line 1211 is used as an example for description, and an actual structure and an actual arrangement manner of the grid line 1211 are not limited.

For example, in a possible implementation, as shown in FIG. 8, an included angle between the first sub-grid line 1211a and the second sub-grid line 1211b is 90 degrees. In other words, in the plane direction of the electrode sub-layer 121, the grid opening 1211d of the grid line 1211 is in a square shape. In another implementation of the present disclosure, the included angle between the first sub-grid line 1211a and the second sub-grid line 1211b may alternatively be an included angle of another value, for example, 60 degrees, 70 degrees, or 80 degrees. In the plane direction of the electrode sub-layer 121, a structural shape of the grid opening 1211d may alternatively be a rhombus or the like.

In other words, the included angle between the first sub-grid line 1211a and the second sub-grid line 1211b may be adjusted based on an actual optical requirement or the like. This is not specifically limited in the present disclosure.

The grid line 1211 between any two adjacent electrode regions 1213 forms a fracture 12111 at the channel 1212. It may be understood that a plurality of fractures 12111 can disconnect the grid line 1211. When the fracture 12111 is continuously disposed in a direction, the channel 1212 can be formed, to divide the electrode sub-layer 121 into the plurality of independent electrode regions 1213.

It may be understood that the grid line 1211 is arranged at the touch layer 12, and the plurality of channels 1212 are disposed to disconnect the grid line 1211, so that the grid line 1211 can be divided into the plurality of independent electrode regions 1213, to implement the touch sensing and detection functions of the touch layer 12 through the cooperation between the plurality of electrode regions 1213, and enable the touchscreen 10 to implement touch control effect.

It should be noted that, in FIG. 8, only one possible implementation of the channel 1212 is used as an example to describe features such as a structural shape, an extension direction, and a structural size of the channel 1212, and features such as an actual structural shape, an extension direction, and a structural size of the channel 1212 are not limited to only those shown in FIG. 8.

Specifically, the grid line 1211 located in two adjacent electrode regions 1213 has a terminal 12112 in a position in which the channel 1212 is formed, and the terminal 12112 is constructed as a boundary of the fracture 12111. In other words, the grid line 1211 has the terminal 12112 at the fracture 12111, one end of the terminal 12112 communicates with the intersection part 1211c, and the other end of the terminal 12112 away from the intersection part 1211c is constructed as the boundary of the fracture 12111.

It should be noted that structures such as the terminal 12112 and the intersection part 1211c described in this specification are essentially some structures of the grid line 1211 in different positions or used to implement different functions. For ease of description in the present disclosure, the some structures of the grid line 1211 in different positions or used to implement different functions are distinguished, but this does not indicate that the terminal 12112, the intersection part 1211c, and the like are different from a material, a manufacturing process, and the like of another part of the grid line 1211.

It may be understood that, in the implementation shown in FIG. 8, two opposite terminals 12112 may be configured to construct two opposite boundaries of one fracture 12111, to form one fracture 12111.

As shown in FIG. 9, a width W1 of the fracture 12111 is greater than or equal to 8 micrometers (micrometer, μm).

In other words, the width W1 of the fracture 12111 may be 8 µm, 10 µm, 20 µm, or another value greater than or equal to 8 µm.

It may be understood that, on the touchscreen 10 in the present disclosure, the width W1 of the fracture 12111 is set to be greater than or equal to 8 µm, to expand a width of the channel 1212, so that when the touchscreen 10 is bent, stress concentration at the fracture 12111 can be reduced, a crack, a break, or the like of each film layer at the touch layer 12 at the fracture 12111 can be avoided, and use reliability and a service life of the touchscreen 10 can be further improved.

In a possible implementation, a length of the terminal 12112 is from 0.5 µm to 3 µm.

Specifically, as shown in FIG. 9, in the plane direction of the electrode sub-layer 121, the terminal 12112 has a first length L1, that is, the first length L1 is from 0.5 µm to 3 µm. The first length L1 of the terminal 12112 is a distance between one end that is of the terminal 12112 and that communicates with the intersection part 1211c and the other end that is of the terminal 12112 and that is away from the intersection part 1211c.

It may be understood that the length of the terminal 12112 is set to 0.5 µm to 3 µm, so that stress concentration generated because the grid line 1211 has a sharp corner at the intersection part 1211c can be avoided. In addition, the length of the terminal 12112 at the fracture 12111 is set to 0.5 µm to 3 µm, to further expand the width of the channel 1212, thereby further reducing the stress concentration at the fracture 12111 during bending.

Figure 10:
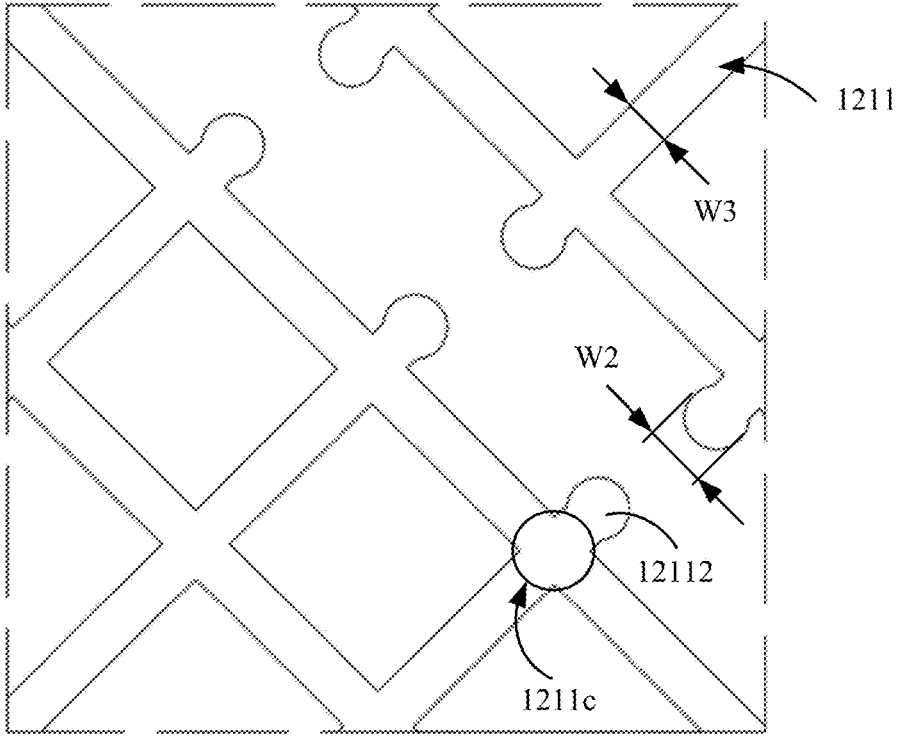
FIG. 10 is a diagram of a partially planar structure of a grid line at a touch layer in a possible implementation.

In a possible implementation, FIG. 10 is a diagram of a partially planar structure of the grid line 1211 at the touch layer 12 in a possible implementation. As shown in FIG. 10, a width W2 of the terminal 12112 is greater than a width W3 of the grid line 1211.

It may be understood that, in this implementation, the width W2 of the terminal 12112 is set to be greater than the width W3 of the grid line 1211, so that a stress bearing area at the terminal 12112 when the touchscreen 10 is bent can be increased, and stress generated at the terminal 12112 when the touchscreen 10 is bent can be further dispersed, to improve stress concentration at the terminal 12112 during bending.

Specifically, in the implementation shown in FIG. 10, in the position corresponding to the fracture 12111, one end of at least a part of the grid line 1211 constructed as the boundary of the fracture 12111 communicates with the intersection part 1211c, the other end that is away from the intersection part 1211c is constructed as the terminal 12112, and in a plane direction of the touch layer 12, a shape of the boundary at which the terminal 12112 is constructed as the fracture 12111 is a circular arc.

In other words, the shape of the boundary at which terminal 12112 is constructed as the fracture 12111 is the circular arc, and a diameter of the circular arc is greater than the width W3 of the grid line 1211, so that the width W2 of the terminal 12112 is greater than the width W3 of the grid line 1211.

It should be noted that, in the implementation shown in FIG. 10, only an example in which the boundary at which the terminal 12112 is constructed as the fracture 12111 is the circular arc is used for description, and the shape of the boundary at which the terminal 12112 is constructed as the fracture 12111 is not limited to the circular arc. In another embodiment of the present disclosure, in the plane direction of the touch layer 12, the shape of the boundary at which the terminal 12112 is constructed as the fracture 12111 is an arc.

For example, in a possible implementation, the shape of the boundary at which the terminal 12112 is constructed as the fracture 12111 may alternatively be an elliptical arc, another arc, or the like.

It may be understood that, in this implementation, the shape of the boundary at which the terminal 12112 is constructed as the fracture 12111 is disposed to be the arc, so that the stress concentrated at the terminal 12112 can be smoothly transited and dispersed at the boundary at which the terminal 12112 is constructed as the fracture 12111, thereby further reducing the stress concentration.

In a possible implementation, the width W2 of the terminal 12112 is greater than or equal to 3.5 µm.

In this implementation, the width W2 of the terminal 12112 is set to be greater than or equal to 3.5 µm, to increase a force-bearing area of the terminal 12112, so as to disperse the stress generated by each film layer structure at the terminal 12112 when the touchscreen 10 is bent, thereby improving the stress concentration at the terminal 12112 during bending.

It should be noted that, in the implementation shown in FIG. 10, only one possible implementation of the terminal 12112 is used as an example for description. In another possible implementation of the present disclosure, one end of the terminal 12112 may alternatively communicate with the intersection part 1211c, and the other end of the terminal 12112 away from the intersection part 1211c is constructed as the boundary of the fracture 12111 (as shown in FIG. 8).

Figure 11:
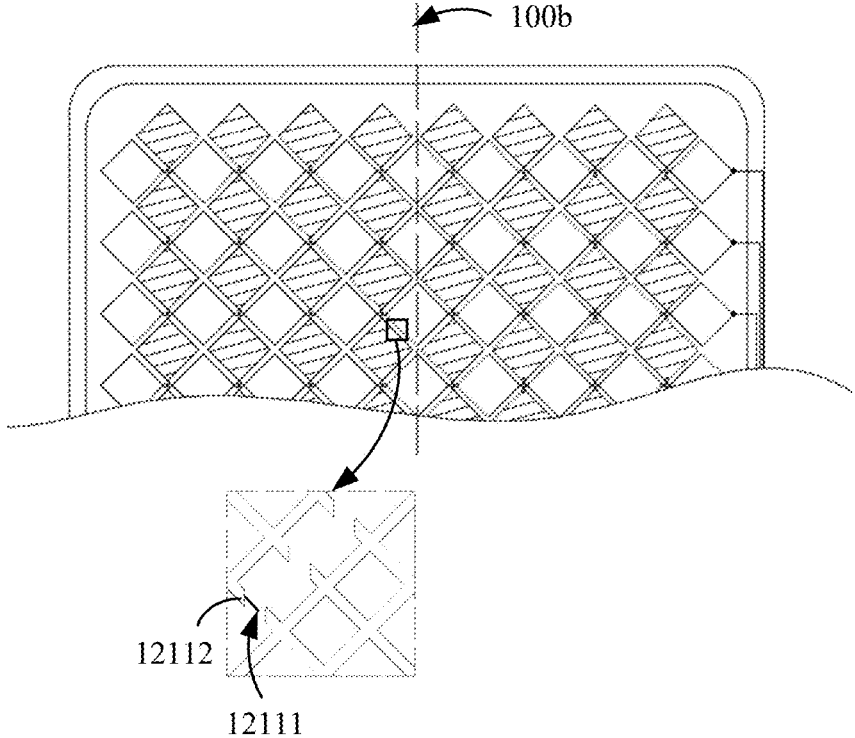
FIG. 11 is a diagram of a partially planar structure of a grid line at a touch layer in a possible implementation.

In a possible implementation, FIG. 11 is a diagram of a partially planar structure of the grid line 1211 at the touch layer 12 in a possible implementation. In the implementation shown in FIG. 11, each fracture 12111 is parallel to the bending central axis 100b of the bending region 100a.

Specifically, as shown in FIG. 11, when the electronic device 100 is bent around the bending central axis 100b, at least some structures at the touch layer 12 located in the bending region 100a are bent around the bending central axis 100b. In the plane direction of the electrode sub-layer 121, a boundary extension direction of each fracture 12111 is parallel to the bending central axis 100b.

In this implementation, the fractures 12111 are disposed to be all parallel to the bending central axis 100b of the bending region 100a, that is, boundaries of the fractures 12111 are disposed to be all parallel to the bending central axis 100b, to disperse the stress generated when the touchscreen 10 is bent, and avoid the stress concentration at the fracture 12111.

In addition, the fractures 12111 are disposed to be all parallel to the bending central axis 100b of the bending region 100a, so that areas of the fractures 12111 in a direction in the bending central axis 100b can be increased, the stress generated during bending can be further dispersed, and the stress concentration can be avoided.

Figure 12:
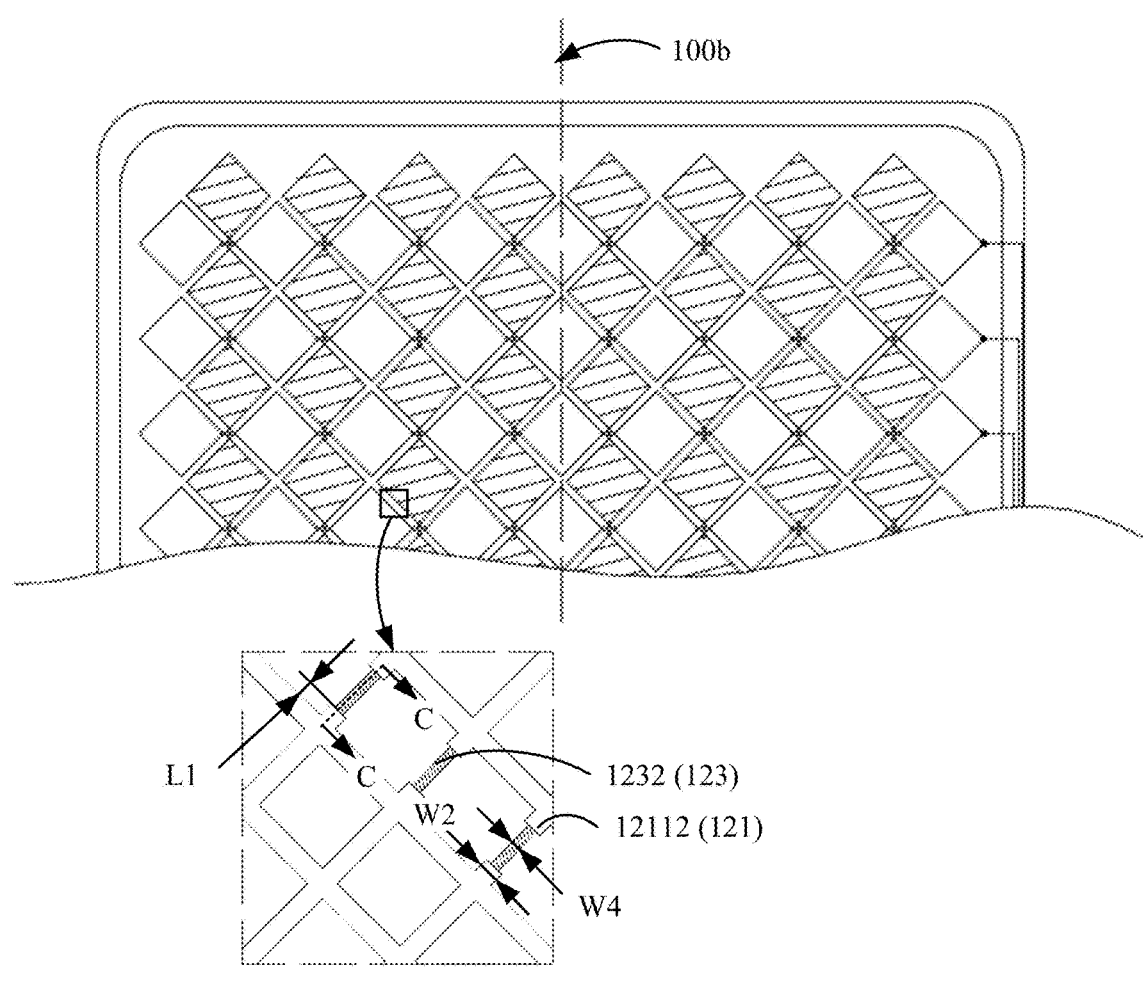
FIG. 12 is a diagram of a partially planar structure of a grid line at a touch layer in a possible implementation.
Figure 13:
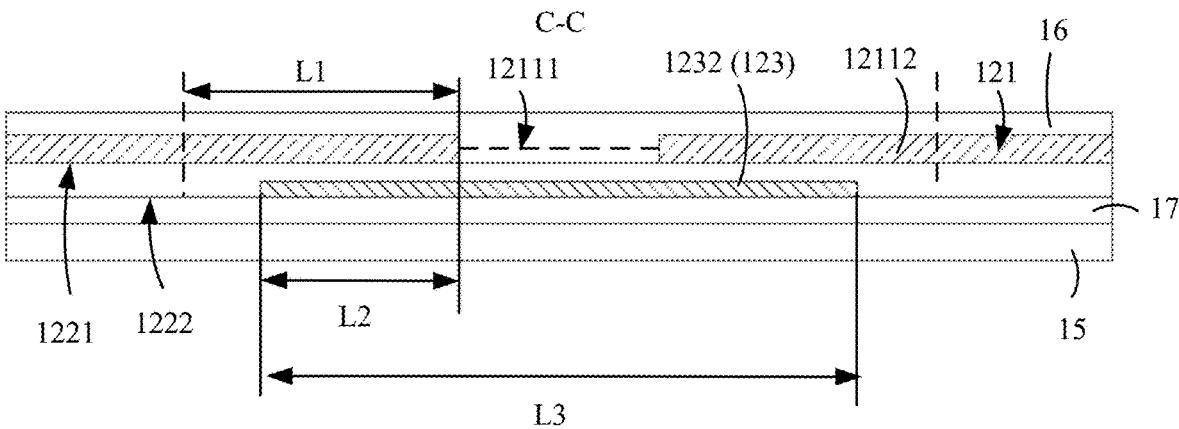
FIG. 13 is a diagram of a sectional structure of the touch layer in a position C-C in the implementation shown in FIG. 12.

In a possible implementation, refer to both FIG. 12 and FIG. 13. FIG. 12 is a diagram of a partially planar structure of the grid line 1211 at the touch layer 12 in a possible implementation, and FIG. 13 is a diagram of a sectional structure of the touch layer 12 in a position C-C in the implementation shown in FIG. 12. A plurality of support sections 1232 are disposed at the connection sub-layer 123, and in a length direction of each support section 1232, projection of each support section 1232 on the first surface 1221 covers one fracture 12111. The length direction of the support section 1232 is an extension direction of the support section 1232.

Specifically, in the implementation shown in FIG. 12, corresponding to a non-bridging position at the touch layer 12, the support section 1232 is further disposed on a side of the second surface 1222 of the insulation sub-layer 122 at the connection sub-layer 123. In other words, corresponding to some fractures 12111, the connection section 1231 is disposed at the connection sub-layer 123, to communicate with at least some of the electrode regions 1213. The support section 1232 is disposed at the connection sub-layer 123 in a position corresponding to each fracture 12111 at which the connection section 1231 is not disposed.

It may be understood that, in this implementation, the support section 1232 is disposed, and in the length direction of each support section 1232, the projection of each support section 1232 on the first surface 1221 is disposed to cover one fracture 12111. In this way, the support section 1232 overlaps the terminal 12112 in a direction in which the electrode sub-layer 121 is opposite to the insulation sub-layer 122, so that the support section 1232 functions as a reinforcing rib at the connection sub-layer 123, that is, a stress bearing capacity of the connection sub-layer 123 at the fracture 12111 can be enhanced, and a crack, a break, or the like of the connection sub-layer 123 at the fracture 12111 can be avoided.

It should be noted that, in the implementation shown in FIG. 12, a material of the support section 1232 may be the same as a material of the connection section 1231. In another implementation of the present disclosure, the material of the support section 1232 may alternatively be adjusted based on a design requirement. For example, the support section 1232 may alternatively be made of another material with good resilience and strength.

In addition, in the implementation shown in FIG. 12, only one possible implementation of the support section 1232 is used as an example for description, and features such as an arrangement position and a structural size of the support section 1232 are not limited.

For example, in a possible implementation, the support section 1232 may further extend in a direction away from the fracture 12111 corresponding to the support section 1232, and an extension cable of the support section 1232 may correspond to at least a part of the grid line 1211 at the electrode sub-layer 121, that is, the projection of the support section 1232 on the first surface 1221 coincides with at least the part of the grid line 1211.

For example, in a possible implementation, a thickness of the support section 1232 may be the same as a thickness of the connection section 1231.

In a possible implementation, as shown in FIG. 13, a length L3 of the support section 1232 is greater than or equal to 4 μm.

It may be understood that, in this implementation, the length L3 of the support section 1232 is set to be greater than or equal to 4 μm, so that a stress bearing capacity of the support section 1232 can be ensured, to further improve the stress bearing capacity of the connection sub-layer 123 at the fracture 12111.

In a possible implementation, a terminal 12112 constructed as a boundary of a fracture 12111 has a first length L1, and a length of an overlapping part between the projection of the support section 1232 on the first surface 1221 and the terminal 12112 is a second length L2, and the second length L2 is less than or equal to ½L1.

In this implementation, the second length L2 of the overlapping part between the projection of the support section 1232 on the first surface 1221 and the terminal 12112 is set to be less than or equal to ½L1, so that an overlapping length between the support section 1232 and the terminal 12112 in the direction in which the electrode sub-layer 121 is opposite to the insulation sub-layer 122 can be ensured, to further ensure the stress bearing capacity of the support section 1232, and form a good stress bearing capacity.

In a possible implementation, still refer to FIG. 12. As shown in FIG. 12, the width W2 of the terminal 12112 is greater than or equal to a width W4 of the support section 1232.

It may be understood that, in this implementation, the width W2 of the terminal 12112 is set to be greater than or equal to the width W4 of the support section 1232, so that the stress bearing capacity of the connection sub-layer 123 during bending can be improved, and the support section 1232 does not affect the light emission during the display of the display layer 11 of the electronic device 100, to improve use effect and applicability of the touch layer 12.

Figure 14:
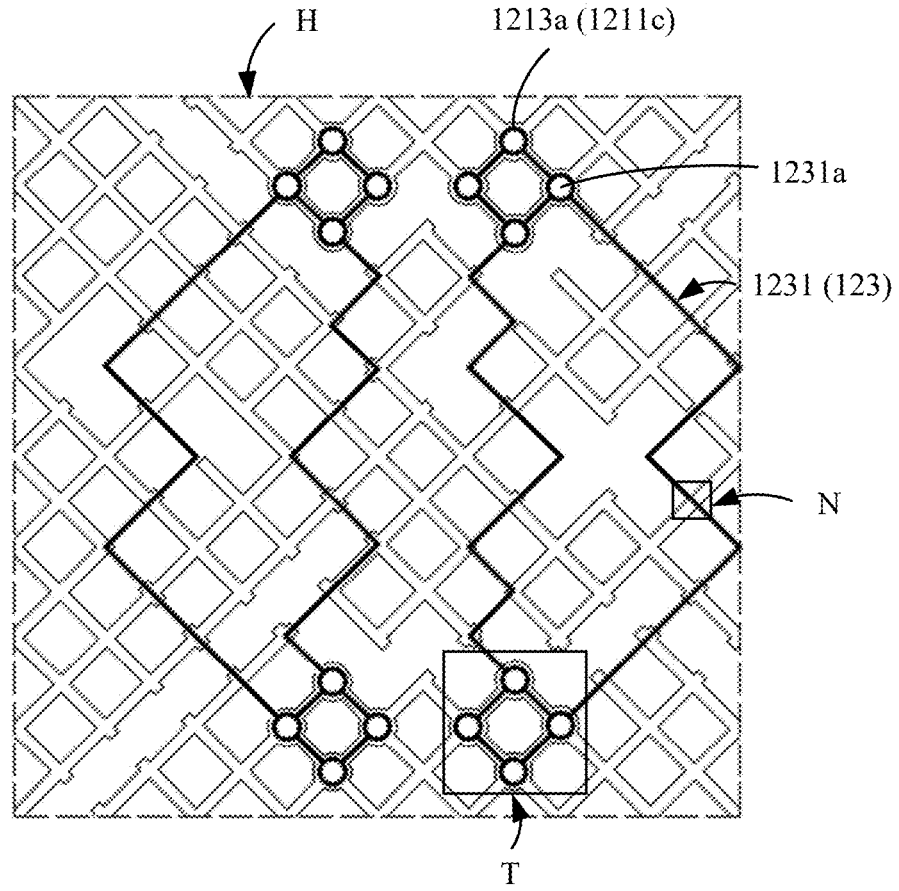
FIG. 14 is a diagram of a partially enlarged planar structure of the touchscreen in a position H in the implementation shown in FIG. 5.
Figure 15:
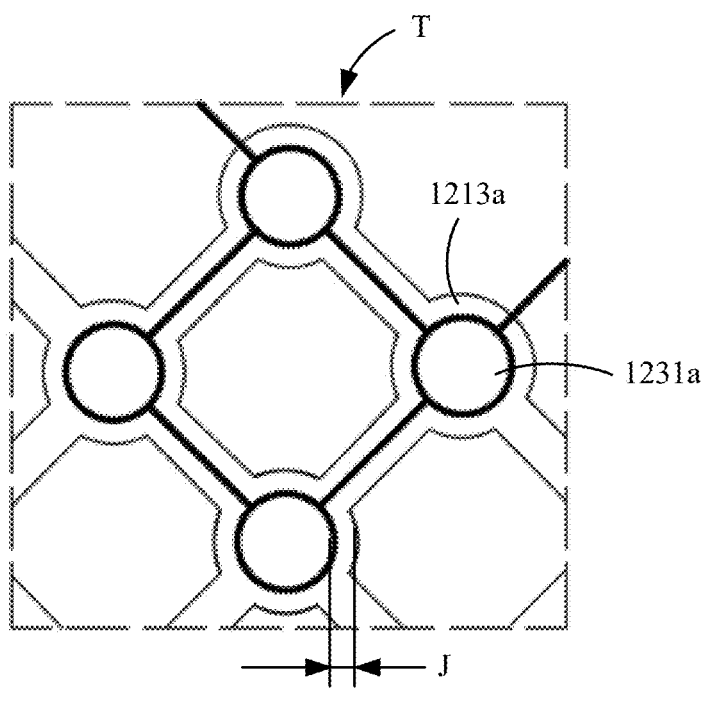
FIG. 15 is a diagram of a partially enlarged planar structure in a position T in the implementation shown in FIG. 14.

In a possible implementation, refer to FIG. 14 and FIG. 15. FIG. 14 is a diagram of a partially enlarged planar structure of the touch layer 12 in a position H in the implementation shown in FIG. 5, and FIG. 15 is a diagram of a partially enlarged planar structure in a position T in the implementation shown in FIG. 14. The electrode region 1213 has a first connection end 1213a at the via 1223, the connection section 1231 (shown by a thick solid line in the figure) has a second connection end 1231a at the via 1223, and projection of the second connection end 1231a on the first surface 1221 is accommodated in the first connection end 1213a. It may be understood that the first connection end 1213a and the second connection end 1231a are in a stacking relationship with each other in a direction in which the electrode sub-layer 121 is opposite to the connection sub-layer 123, and communicate with each other through the via 1223.

It should be noted that, in the implementation shown in FIG. 14, only one possible implementation of the connection section 1231 is used as an example for description, and an actual structural shape and an actual cabling direction of the connection section 1231 are not limited. In other words, in another implementation of the present disclosure, the actual structural shape of the connection section 1231 may be adjusted based on an actual design requirement, for example, an optical requirement or a reliability requirement. This is not specifically limited in the present disclosure.

In addition, for ease of distinguishing between the connection section 1231 and the grid line 1211, in the implementation shown in FIG. 14, the thick solid line indicates the connection section 1231, but does not indicate an actual structural feature of the connection section 1231.

Specifically, in the implementation shown in FIG. 14, the plurality of grid lines 1211 located in the electrode region 1213 intersect to form the plurality of intersection parts 1211c. In the direction in which the electrode sub-layer 121 is opposite to the insulation sub-layer 122, at least some of the intersection parts 1211c are aligned with the via 1223, that is, the at least some of the intersection parts 1211c of the grid line 1211 in a position corresponding to the via 1223 are constructed as the first connection end 1213a. The connection section 1231 forms the second connection end 1231a in a position corresponding to the via 1223. The first connection end 1213a communicates with the second connection end 1231a through the via 1223, to conduct the some of the electrode regions 1213.

The projection of the second connection end 1231a on the first surface 1221 is accommodated in the first connection end 1213a. In other words, in the implementation shown in FIG. 15, in a plane direction of the insulation sub-layer 122, structural shapes of both the first connection end 1213a and the second connection end 1231a are circles, and a diameter of the first connection end 1213*a* is greater than or equal to a diameter of the second connection end 1231*a*.

In other words, in the plane direction of the insulation sub-layer 122, an area of the first connection end 1213*a* is greater than or equal to an area of the second connection end 1231*a*.

It should be noted that, in the implementation shown in FIG. 15, the first connection end 1213*a* and the second connection end 1231*a* in only one possible implementation are used as examples for description. In another embodiment of the present disclosure, the structural shapes of the first connection end 1213*a* and the second connection end 1231*a* may alternatively be squares, rhombus, or any other polygons, and features such as structural sizes of the first connection end 1213*a* and the second connection end 1231*a* may also be adjusted based on an actual design requirement.

It may be understood that, in this implementation, the projection of the second connection end 1231*a* on the first surface 1221 is disposed to be accommodated in the first connection end 1213*a*, to increase a stress bearing area of the grid line 1211, thereby avoiding stress concentration at the first connection end 1213*a*.

In a possible implementation, refer to FIG. 15. In the plane direction of the touch layer 12, a distance J between an edge of the projection of the second connection end 1231*a* on the first surface 1221 and an edge of the first connection end 1213*a* is from 1 μm to 3 μm.

In this implementation, the distance J between the edge of the projection of the second connection end 1231*a* on the first surface 1221 and the edge of the first connection end 1213*a* is set to 1 μm to 3 μm, so that the stress bearing area of the first connection end 1213*a* can be ensured, and impact of the first connection end 1213*a* on the light emission during the display of the display layer 11 of the touchscreen 10 can be avoided, to improve the use effect and the applicability of the touch layer 12.

Figure 16:
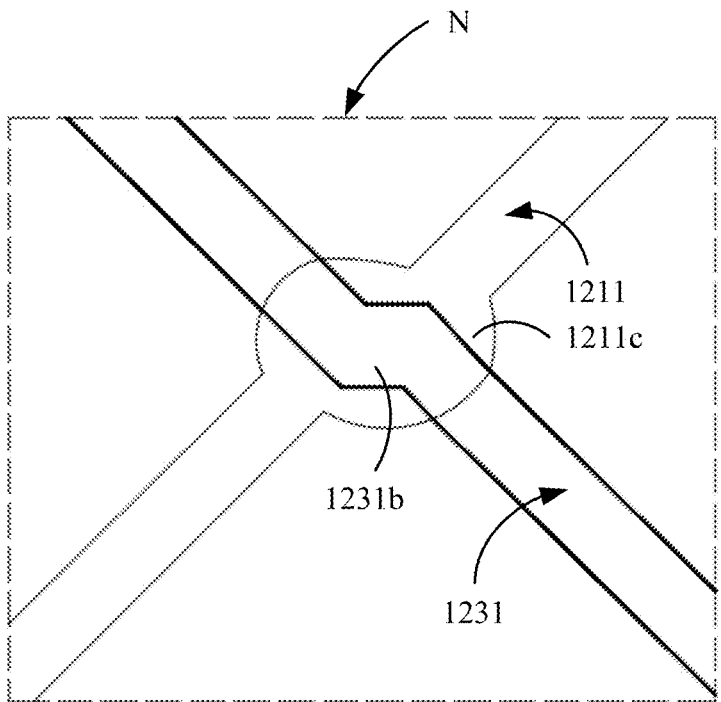
FIG. 16 is a diagram of a partially enlarged planar structure in a position N in the implementation shown in FIG. 14.

In a possible implementation, FIG. 16 is a diagram of a partially enlarged planar structure in a position N in the implementation shown in FIG. 14. As shown in FIG. 16, corresponding to a position in which no via 1223 is disposed, any two adjacent connection sections 1231 have a connection part 1231*b*. In other words, the connection part 1231*b* is a structure formed by connecting the any two adjacent connection sections 1231.

In the implementation shown in FIG. 16, in the direction in which the electrode sub-layer 121 is opposite to the connection sub-layer 123, an extension direction of the connection part 1231*b* corresponds to at least some of the intersection parts 1211*c* formed by intersecting the plurality of grid lines 1211 of the electrode sub-layer 121. In addition, in the plane direction of the electrode sub-layer 121, the extension direction of the connection part 1231*b* intersects a length direction of the intersection part 1211*c*, that is, the connection part 1231*b* and the intersection part 1211*c* do not perpendicularly correspond to each other. In addition, projection of the connection part 1231*b* on the first surface 1221 is accommodated in the intersection part 1211*c*, so that an area of the intersection part 1211*c* can be increased, and a stress bearing capacity of the electrode sub-layer 121 can be further improved, to avoid a crack or a break of the electrode sub-layer 121 or another film layer structure caused by the stress concentration.

It should be noted that, in the implementation shown in FIG. 16, only the connection part 1231*b* and the intersection part 1211*c* are used as examples for description, and actual structural shapes of the connection part 1231*b* and the intersection part 1211*c* are not limited. In another implementation of the present disclosure, actual structural shapes of the connection part 1231*b* and the intersection part 1211*c* may both be adjusted based on an actual requirement. This is not specifically limited in the present disclosure.

Figure 17:
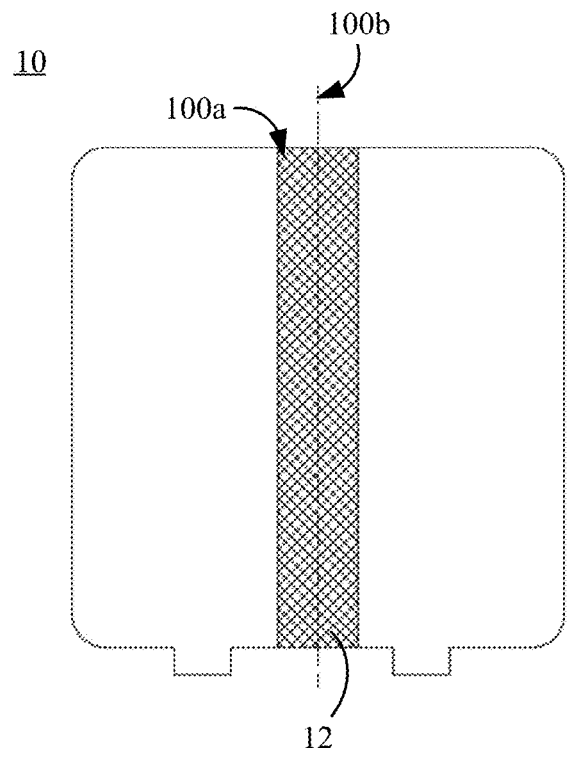
FIG. 17 is a diagram of a planar structure of a touchscreen in a possible implementation.

It may be understood that FIG. 17 is a diagram of a planar structure of the touchscreen 10 in a possible implementation. In the implementation shown in FIG. 17, the touch layer 12 provided in any one of the foregoing implementations is disposed in the bending region 100*a*, so that the film layer structure in the touchscreen 10 can be optimized in a targeted manner, and the stress concentration generated when the touchscreen 10 is bent in the bending region 100*a* can be improved, to reduce a risk that a film layer crack may occur when the touchscreen 10 is bent, and further improve a yield rate and user experience of the electronic device 100.

In other words, in the foregoing implementation, the touch layer 12 located in the bending region 100*a* may be optimized in a targeted manner, to avoid a film layer break or crack caused by the stress concentration generated when the touchscreen 10 is bent, but this does not mean that the touch layer used to implement the touch sensing and detection functions is disposed only in the bending region 100*a* on the touchscreen 10. In another implementation of the present disclosure, the touch layer 12 provided in any one of the foregoing implementations may alternatively be disposed in another position of the touchscreen 10.

Figure 18:
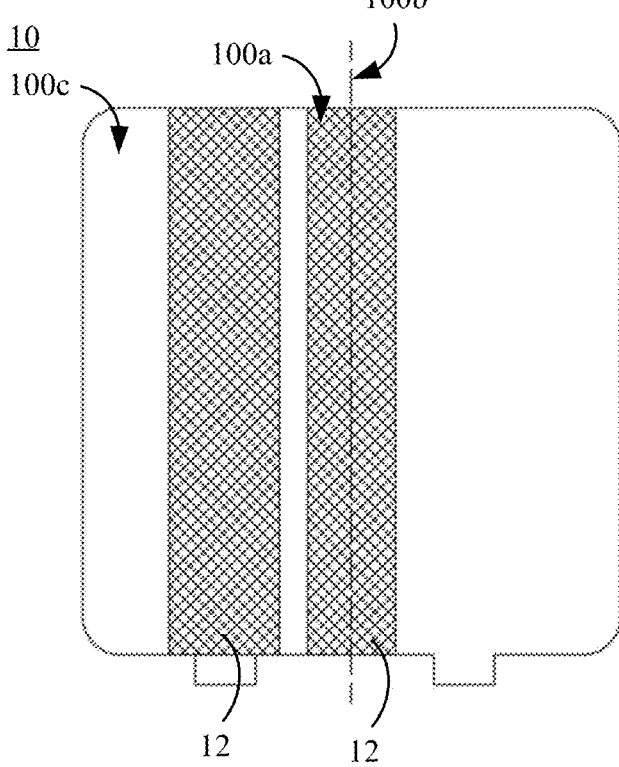
FIG. 18 is a diagram of a planar structure of a touchscreen in a possible implementation.

For example, in a possible implementation, FIG. 18 is a diagram of a planar structure of the touchscreen 10 in a possible implementation. As shown in FIG. 18, the electronic device 100 further includes a non-bending region 100*c*. In other words, electronic structures or components of the electronic device 100 that are located in the non-bending region 100*c* may not be folded, curved, or the like.

At least some of the structures of the touchscreen 10 are also located in the non-bending region 100*c*, that is, the touchscreen 10 further includes the non-bending region 100*c*, the non-bending region 100*c* is located on at least one side of the bending region 100*a*, and the touch layer 12 is further at least partially disposed in the non-bending region 100*c*.

It may be understood that, in this implementation, the touch layer 12 is disposed to be at least partially disposed in the non-bending region 100*c*, so that each film layer structure of the touch layer 12 located in the non-bending region 100*c* can be optimized, to improve a stress bearing capacity of each film layer located in the non-bending region 100*c*, reduce stress concentration of each film layer located in the non-bending region 100*c*, and avoid a film layer break, a film layer crack, or the like of the touchscreen 10 in the non-bending region.

It should be noted that, in FIG. 18, only one possible implementation of the non-bending region 100*c* is used as an example to describe the arrangement position of the touch layer 12 and the like, but an arrangement area, an arrangement position, and the like of the non-bending region 100*c* are not limited to only those shown in FIG. 18. In other words, corresponding to different design requirements or corresponding to bending requirements of different electronic devices 100, the features such as the arrangement area and the arrangement position of the non-bending region 100*c* may be adjusted based on an actual requirement.

Figure 19:
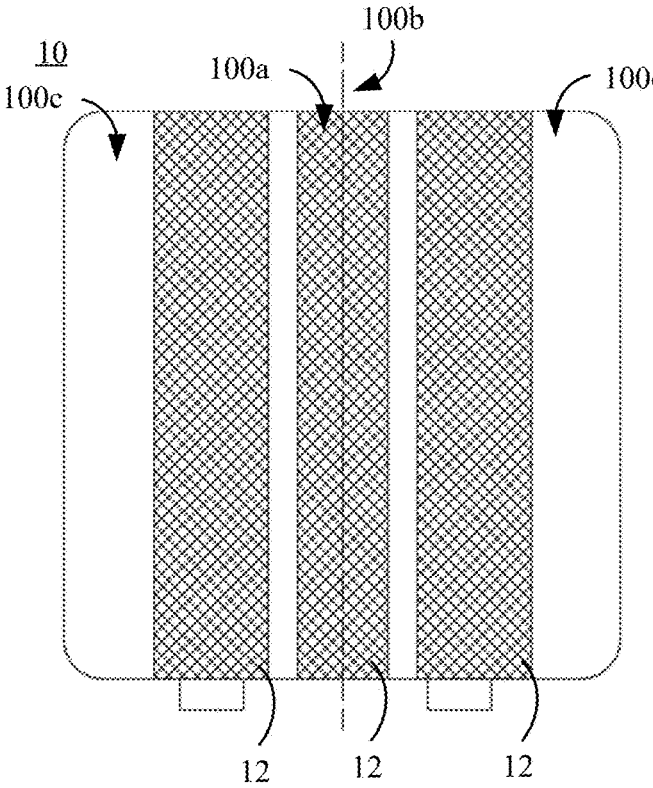
FIG. 19 is a diagram of a planar structure of a touchscreen in a possible implementation.

For example, in a possible implementation, FIG. 19 is a diagram of a planar structure of the touchscreen 10 in a possible implementation. In the implementation shown in FIG. 19, the non-bending region 100*c* is located on two opposite sides of the bending region 100*a*.

Figure 20:
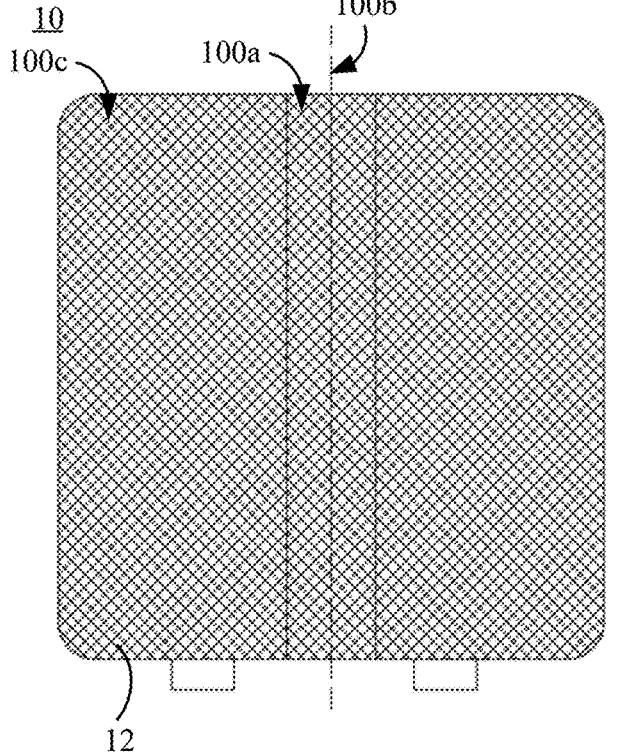
FIG. 20 is a diagram of a planar structure of a touchscreen in a possible implementation.

For example, in a possible implementation, FIG. 20 is a diagram of a planar structure of the touchscreen 10 in a possible implementation. In the implementation shown in FIG. 20, the touch layer 12 completely covers the non-bending region 100c.

In this implementation, the touch layer 12 is disposed to completely cover the non-bending region 100c, so that the crack or the break that occurs at each film layer in the touchscreen 10 can be reduced, thereby ensuring the use reliability of the entire touchscreen 10.

Figure 21:
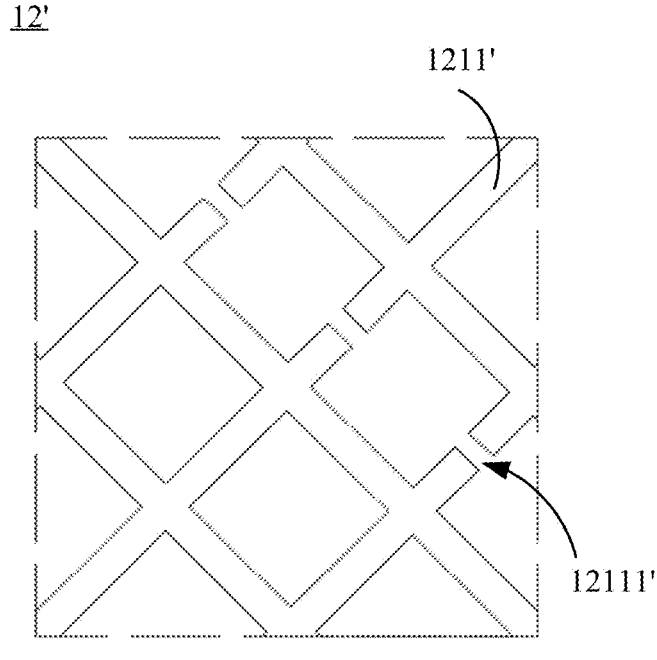
FIG. 21 is a diagram of a partially planar structure of a grid line at a touch layer according to a comparison embodiment.
Figure 22:
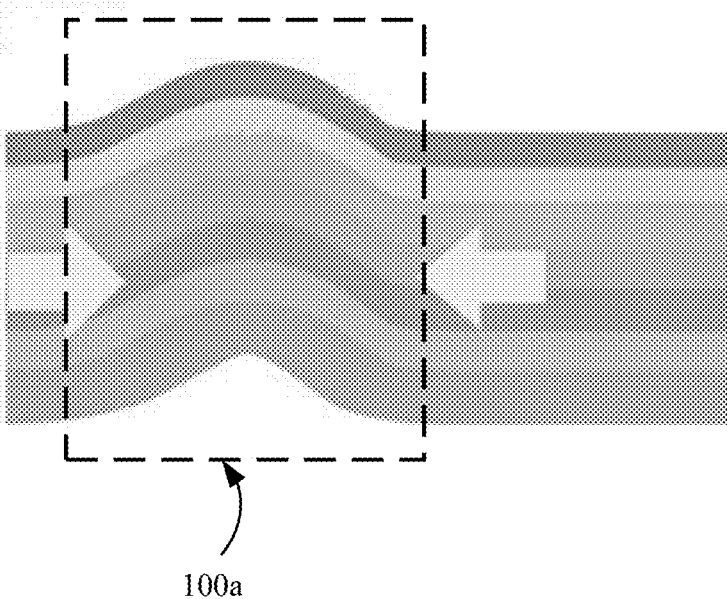
FIG. 22 is a diagram of a sectional structure of a perspective of the touch layer during bending in the embodiment shown in FIG. 21.

Refer to both FIG. 21 and FIG. 22. FIG. 21 is a diagram of a partially planar structure of a grid line 1211' at a touch layer 12' according to a comparison embodiment, and FIG. 22 is a diagram of a sectional structure of a perspective of the touch layer 12' during bending in the embodiment shown in FIG. 21. In the comparison embodiment shown in FIG. 21, a width of a fracture 12111' of the grid line 1211' is excessively small, so that stress concentration is likely to be generated at the fracture 12111' of the grid line 1211'. In addition, materials of some film layers in the touchscreen 10 have insufficient resilience in performance and poor bending performance. Therefore, large stress is concentrated in the bending region 100a of the touchscreen 10 and cracks or breaks likely occur at some film layers. This causes a problem that a black spot, a screen failure, or the like likely occurs during the display of the electronic device 100.

However, on the touchscreen 10 in the present disclosure, the width W1 of the fracture 12111 is set to be greater than or equal to 8 µm, to expand the width of the channel 1212, so that when the touchscreen 10 is bent, the stress concentration at the fracture 12111 can be reduced, the crack, the break, or the like of each film layer at the touch layer 12 at the fracture 12111 can be avoided, and the use reliability and the service life of the touchscreen 10 can be further improved. In this way, the yield rate and user experience of the electronic device 100 in the present disclosure are further improved.

Figure 23:
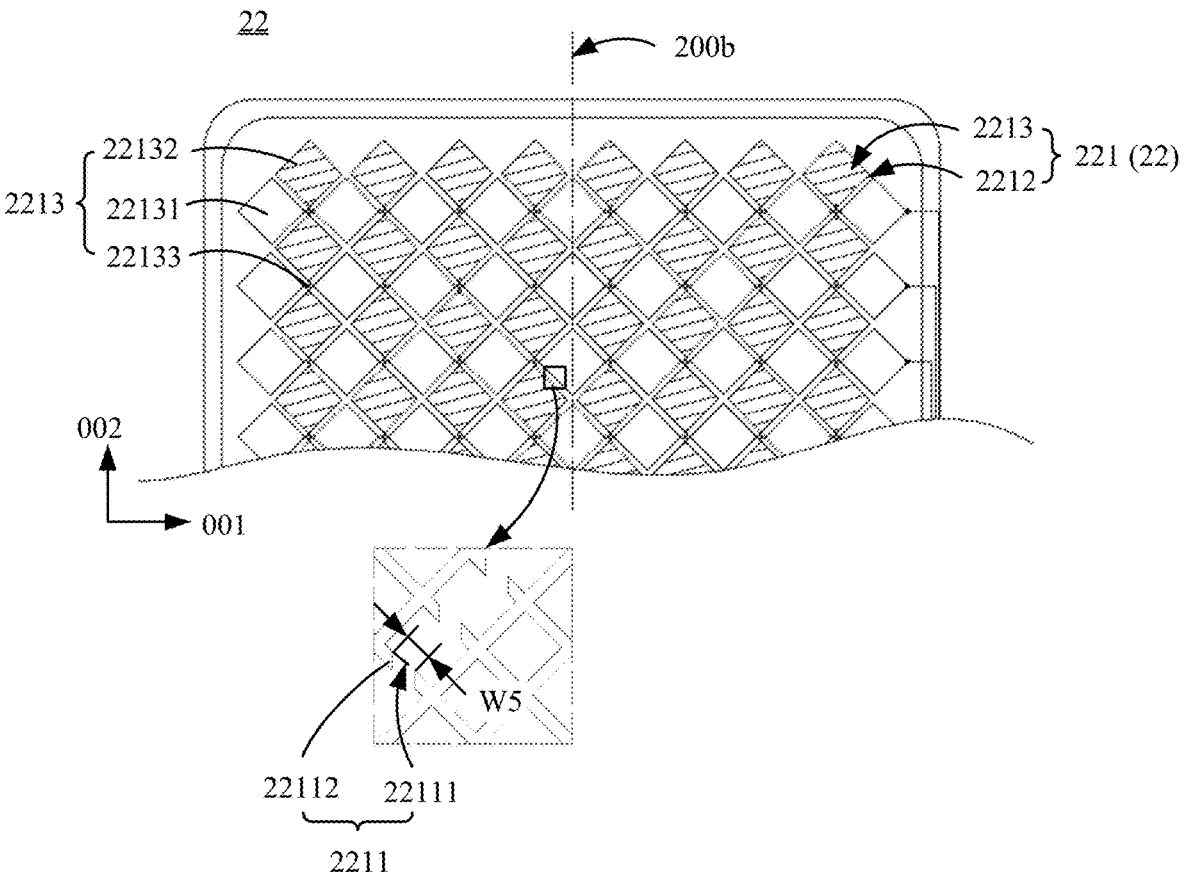
FIG. 23 is a diagram of a partially planar structure of a touch layer of another touchscreen according to the present disclosure.
Figure 24:
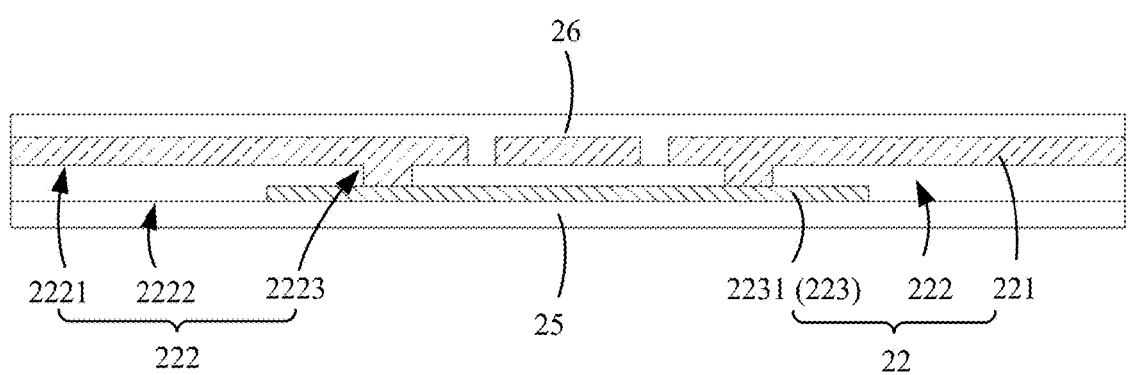
FIG. 24 is a diagram of a sectional structure of a perspective of the touch layer in the embodiment shown in FIG. 23.

Refer to both FIG. 23 and FIG. 24. FIG. 23 is a diagram of a partially planar structure of a touch layer 22 of another touchscreen 20 according to the present disclosure, and FIG. 24 is a diagram of a sectional structure of a perspective of the touch layer 22 in the embodiment shown in FIG. 23. The touchscreen 20 includes a plurality of film layer structures that are the same as those of the touchscreen 10. Therefore, in the touchscreen 20, numbers corresponding to the film layer structures in the touchscreen 10 are the same, and a difference lies in that the reference numerals in the accompanying drawings start with "2" instead of "1".

In the implementation shown in FIG. 23, the touchscreen 20 also has a bending region 200a (refer to FIG. 28), the touch layer 22 is disposed in the bending region 200a, and the touch layer 22 also includes an electrode sub-layer 221, an insulation sub-layer 222, and a connection sub-layer 223. The electrode sub-layer 221 is constructed as a grid line 2211 arranged on a first surface 2221 of the insulation sub-layer 222. A plurality of channels 2212 for disconnecting the grid line 2211 are also disposed at the touch layer 22, the plurality of channels 2212 divide the grid line 2211 into a plurality of electrode regions 2213, and the grid line 2211 between any two adjacent electrode regions 2213 forms a fracture 22111 at the channel 2212.

As shown in FIG. 24, a plurality of connection sections 2231 are also further disposed at the connection sub-layer 223, a plurality of vias 2223 are disposed at the insulation sub-layer 222, and at least some of the electrode regions 2213 are sequentially conducted through the vias 2223 and the connection sections 2231.

Specifically, in a possible implementation, as shown in FIG. 23, the electrode region 2213 also includes a plurality of first electrodes 22131, a plurality of second electrodes 22132, and a plurality of conduction sections 22133. The plurality of first electrodes 22131 are arranged in an array and staggered with the plurality of second electrodes 22132.

The conduction section 22133 is connected between any two adjacent first electrodes 22131 in a first direction 001, to conduct the plurality of first electrodes 22131 in the first direction 001.

The connection section 2231 is connected between any two adjacent second electrodes 22132 in a second direction 002, to conduct the plurality of second electrodes 22132 in the second direction 002.

In a possible implementation, the first electrode 22131 is a touch driving electrode Tx, and the second electrode 22132 is a touch sensing electrode Rx.

In a possible implementation, the first electrode 22131 is a touch sensing electrode Rx, and the second electrode 22132 is a touch driving electrode Tx.

It may be understood that, on the touchscreen 20 in the present disclosure, the grid line 2211 is also arranged at the touch layer 22, and the plurality of channels 2212 are disposed to disconnect the grid line 2211, so that the grid line 2211 can be divided into the plurality of independent electrode regions 2213, to implement touch sensing and detection functions of the touch layer 22 through cooperation between the plurality of electrode regions 2213, and enable the touchscreen 20 to implement touch control effect.

As shown in FIG. 23, each fracture 22111 is parallel to a bending central axis 200b of the bending region 200a.

Specifically, as shown in FIG. 23, when the electronic device 100 is bent around the bending central axis 200b, at least some structures at the touch layer 22 are bent around the bending central axis 200b. In a plane direction of the electrode sub-layer 221, a boundary extension direction of each fracture 22111 is parallel to the bending central axis 200b.

In a possible implementation, a width W5 of the fracture 22111 is from 4 µm to 5.5 µm.

In a possible implementation, as shown in FIG. 23, in this implementation, the touchscreen 20 further includes a flexible substrate 25 and an organic coating layer 26, the touch layer 22 is stacked between the flexible substrate 25 and the organic coating layer 26, and the electrode sub-layer 221 of the touch layer 22 is disposed on a side that is of the insulation sub-layer 222 and that is away from the flexible substrate 25.

In a possible implementation, the touchscreen 20 further includes a buffer layer 27 (refer to FIG. 25), and the buffer layer 27 is connected between the flexible substrate 25 and the connection sub-layer 223 of the touch layer 22 and is configured to relieve pressure on the touch layer 22.

Figure 25:
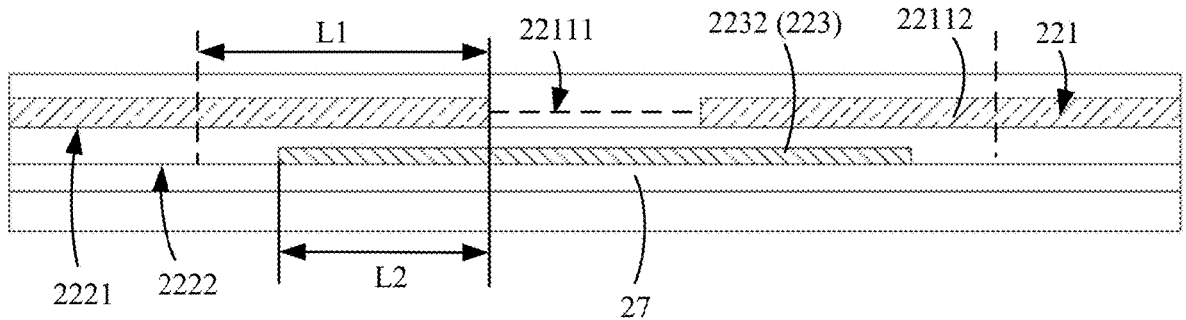
FIG. 25 is a diagram of a sectional structure of a perspective of a touch layer in a possible implementation.

In a possible implementation, FIG. 25 is a diagram of a sectional structure of a perspective of the touch layer 22 in a possible implementation. In the implementation shown in FIG. 25, a plurality of support sections 2232 are also disposed at the connection sub-layer 223 of the touchscreen 20, and in a length direction of each support section 2232, projection of each support section 2232 on the first surface 2221 covers one fracture 22111.

In a possible implementation, a length of the support section 2232 is greater than or equal to 4 µm.

In a possible implementation, refer to FIG. 25. In this implementation, one terminal 22112 of the grid line 2211 has a first length L1, a length of an overlapping part between the projection of the support section 2232 on the first surface 2221 and one terminal 22112 corresponding to the support section 2232 is a second length L2, and the second length L2 is less than or equal to ½L1.

Figure 26:
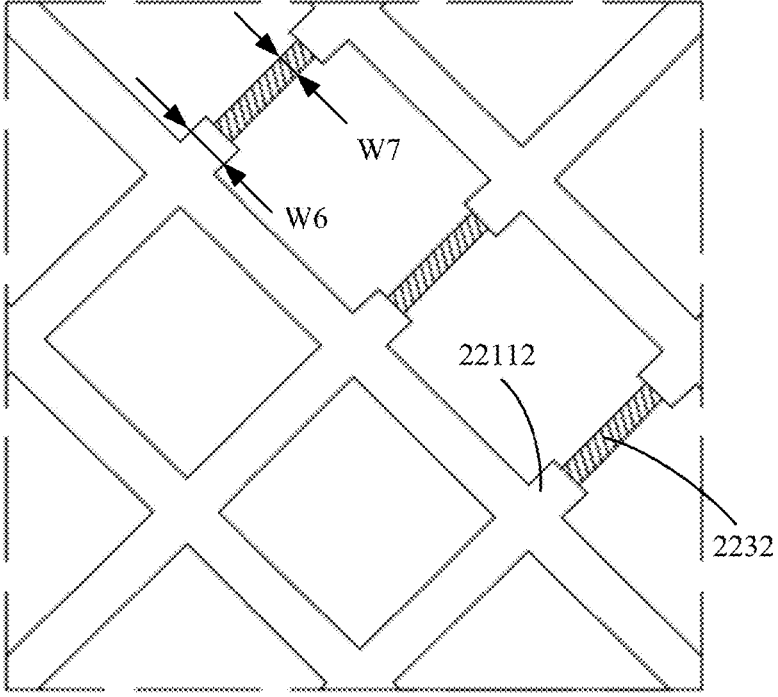
FIG. 26 is a diagram of a partial plane of a grid line in the implementation shown in FIG. 25.

In a possible implementation, FIG. 26 is a diagram of a partial plane of the grid line 2211 in the implementation shown in FIG. 25. In the implementation shown in FIG. 26, a width W6 of the terminal 22112 is greater than or equal to a width W7 of the support section 2232.

In a possible implementation, the width W6 of the terminal 22112 is greater than or equal to 3.5 μm.

Figure 27:
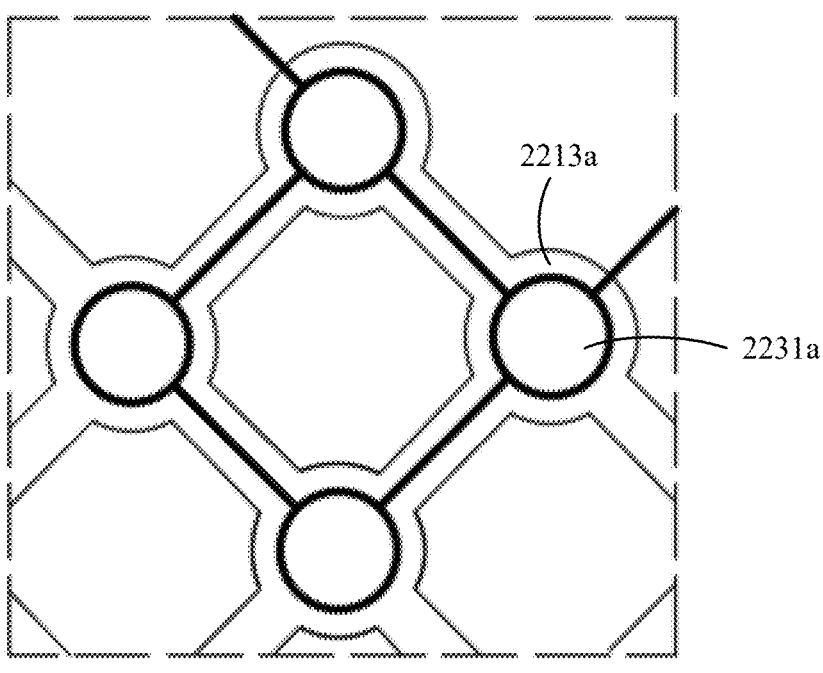
FIG. 27 is a diagram of a partially planar structure of a touch layer in a possible implementation.

In a possible implementation, FIG. 27 is a diagram of a partially planar structure of the touch layer 22 in a possible implementation. In the implementation shown in FIG. 27, the electrode region 2213 also has a first connection end 2213a at the via 2223, the connection section 2231 also has a second connection end 2231a at the via 2223, and projection of the second connection end 2231a on the first surface 2221 is accommodated in the first connection end 2213a.

In a possible implementation, in a plane direction of the touch layer 22, a distance between an edge of the projection of the second connection end 2231a on the first surface 2221 and an edge of the first connection end 2213a is from 1 μm to 3 μm.

Figure 28:
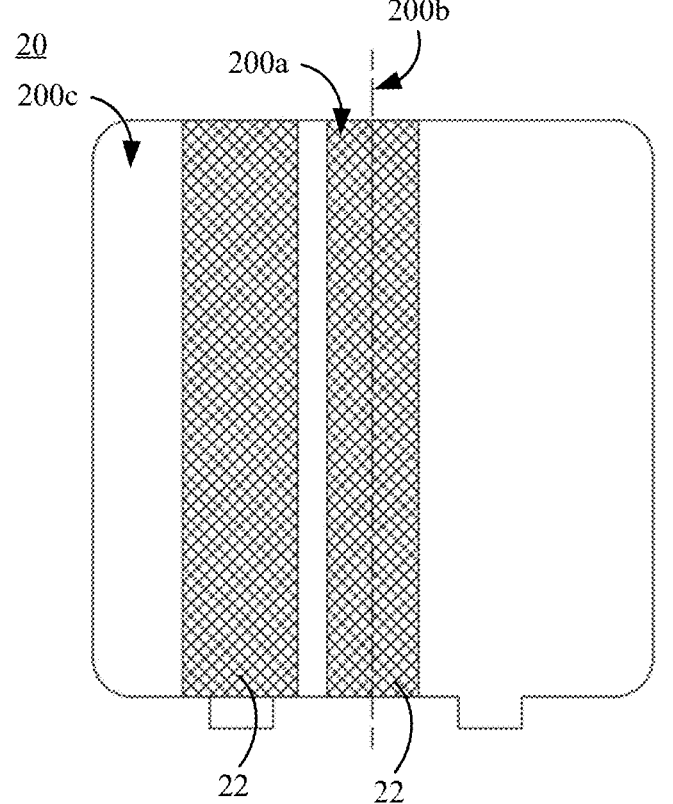
FIG. 28 is a diagram of a planar structure of a touchscreen in a possible implementation.

In a possible implementation, FIG. 28 is a diagram of a planar structure of the touchscreen 20 in a possible implementation. In the implementation shown in FIG. 28, the touchscreen 20 further includes a non-bending region 200c, the non-bending region 200c is located on at least one side of the bending region 200a, and the touch layer 22 is further at least partially disposed in the non-bending region 200c.

In a possible implementation, the non-bending region 200c is located on two opposite sides of the bending region 200a.

In a possible implementation, the touch layer 22 completely covers the non-bending region 200c.

On the touchscreen 20 in the present disclosure, the fractures 22111 are disposed to be all parallel to the bending central axis 200b, that is, boundaries of the fractures 22111 are disposed to be all parallel to the bending central axis 200b, to disperse stress generated when the touchscreen 20 is bent, and avoid stress concentration at the fracture 22111.

In addition, the fractures 22111 are disposed to be all parallel to the bending central axis 200b, so that areas of the fractures 22111 in a direction in the bending central axis 200b can be increased, the stress generated during bending can be further dispersed, and the stress concentration can be avoided. In this way, a crack, a break, or the like of each film layer in the touchscreen 20 at the fracture 22111 can be avoided, to improve use reliability and a service life of the touchscreen 20.

It should be noted that specific structures and technical effect in the foregoing implementations are respectively the same as or similar to specific structures and technical effect in corresponding implementations of the touchscreen 10. Details are not described herein one by one in this embodiment.

Figures 29, 30:
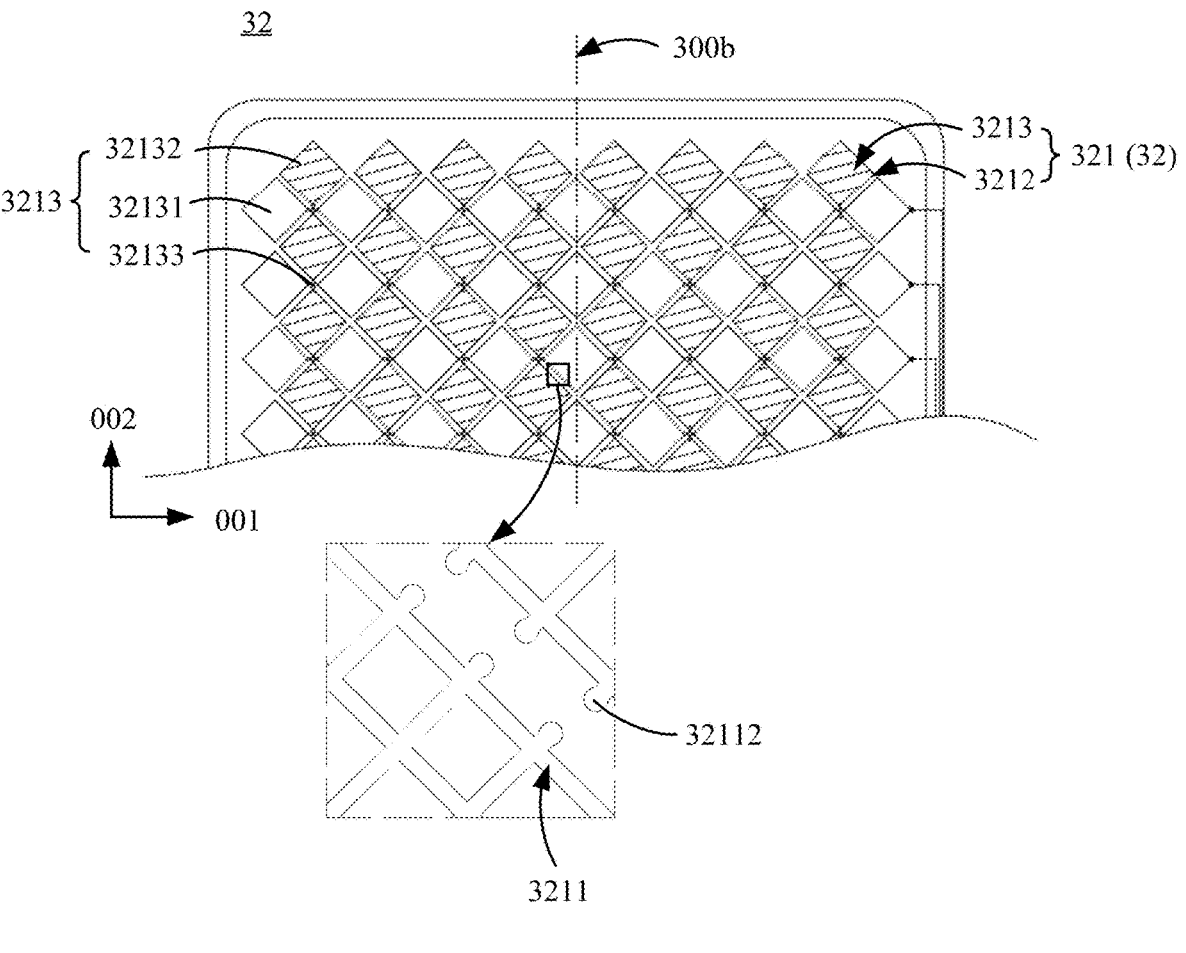
FIG. 29 is a diagram of a partially planar structure of another touchscreen according to the present disclosure.
FIG. 30 is a diagram of a sectional structure of a perspective of a touch layer of the touchscreen in the embodiment shown in FIG. 29.

Refer to both FIG. 29 and FIG. 30. FIG. 29 is a diagram of a partially planar structure of a touch layer 32 of another touchscreen 30 according to the present disclosure, and FIG. 30 is a diagram of a sectional structure of a perspective of the touch layer 32 in the embodiment shown in FIG. 29. The touchscreen 30 includes a plurality of film layer structures that are the same as those of the touchscreen 10. Therefore, in the touchscreen 30, numbers corresponding to the film layer structures in the touchscreen 10 are the same, and a difference lies in that the reference numerals in the accompanying drawings start with "3" instead of "1".

In the implementation shown in FIG. 29, the touchscreen 30 also has a bending region 300a (refer to FIG. 34), the touch layer 32 is disposed in the bending region 300a, and the touch layer 32 also includes an electrode sub-layer 321, an insulation sub-layer 322, and a connection sub-layer 323. The electrode sub-layer 321 is constructed as a grid line 3211 arranged on a first surface 3221 of the insulation sub-layer 322.

A plurality of channels 3212 for disconnecting the grid line 3211 are also disposed at the touch layer 32, the plurality of channels 3212 divide the grid line 3211 into a plurality of electrode regions 3213, and the grid line 3211 between any two adjacent electrode regions 3213 forms a fracture 32111 at the channel 3212.

As shown in FIG. 30, a plurality of connection sections 3231 are also further disposed at the connection sub-layer 323, a plurality of vias 3223 are disposed at the insulation sub-layer 322, and at least some of the electrode regions 3213 are sequentially conducted through the vias 3223 and the connection sections 3231.

Specifically, in a possible implementation, as shown in FIG. 29, the electrode region 3213 also includes a plurality of first electrodes 32131, a plurality of second electrodes 32132, and a plurality of conduction sections 32133. The plurality of first electrodes 32131 are arranged in an array and staggered with the plurality of second electrodes 32132.

The conduction section 32133 is connected between any two adjacent first electrodes 32131 in a first direction 001, to conduct the plurality of first electrodes 32131 in the first direction 001.

The connection section 3231 is connected between any two adjacent second electrodes 32132 in a second direction 002, to conduct the plurality of second electrodes 32132 in the second direction 002.

In a possible implementation, the first electrode 32131 is a touch driving electrode Tx, and the second electrode 32132 is a touch sensing electrode Rx.

In a possible implementation, the first electrode 32131 is a touch sensing electrode Rx, and the second electrode 32132 is a touch driving electrode Tx.

It may be understood that, on the touchscreen 30 in the present disclosure, the grid line 3211 is also arranged at the touch layer 32, and the plurality of channels 3212 are disposed to disconnect the grid line 3211, so that the grid line 3211 can be divided into the plurality of independent electrode regions 3213, to implement touch sensing and detection functions of the touch layer 32 through cooperation between the plurality of electrode regions 3213, and enable the touchscreen 30 to implement touch control effect.

In the implementation shown in FIG. 29, the grid line 3211 between any two adjacent electrode regions 3213 has a terminal 32112 at the channel 3212, and a width of the terminal 32112 is greater than a width of the grid line 3211.

In a possible implementation, the width of the terminal 32112 is greater than or equal to 3.5 μm.

It may be understood that, in this implementation, the width of the terminal 32112 is set to be greater than or equal to 3.5 μm, to increase a force-bearing area of the terminal 32112, so as to disperse stress generated at the terminal 32112 when the touchscreen 30 is bent, thereby improving stress concentration at the terminal 32112 during bending.

In a possible implementation, in a plane direction of the touch layer 32, a shape of the boundary at which the terminal 32112 is constructed as the fracture 32111 is an arc.

In a possible implementation, as shown in FIG. 29, in the plane direction of the touch layer 32, the shape of the boundary at which the terminal 32112 is constructed as the fracture 32111 is a circular arc.

In a possible implementation, as shown in FIG. 30, in this implementation, the touchscreen 30 further includes a flexible substrate 35 and an organic coating layer 36, the touch layer 32 is stacked between the flexible substrate 35 and the organic coating layer 36, and the electrode sub-layer 321 of the touch layer 32 is disposed on a side that is of the insulation sub-layer 322 and that is away from the flexible substrate 35.

In a possible implementation, the touchscreen 30 further includes a buffer layer 37 (refer to FIG. 31), and the buffer layer 37 is connected between the flexible substrate 35 and the connection sub-layer 323 of the touch layer 32 and is configured to relieve pressure on the touch layer 32.

Figure 31:
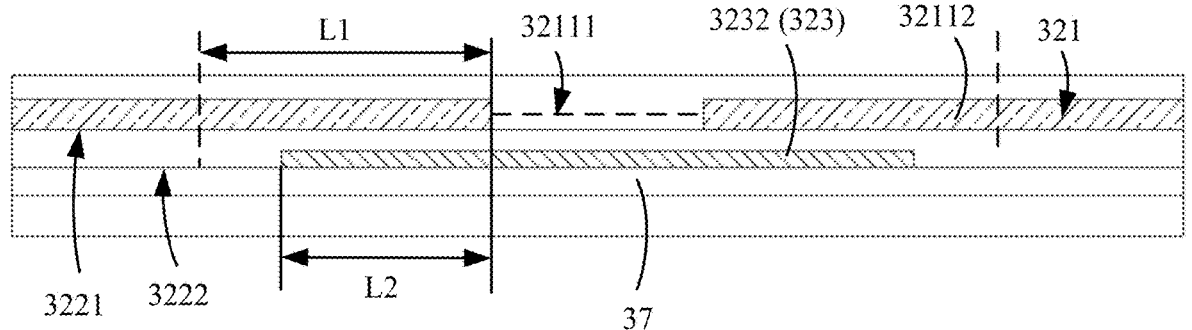
FIG. 31 is a diagram of a sectional structure of a perspective of a touch layer in a possible implementation.

In a possible implementation, FIG. 31 is a diagram of a sectional structure of a perspective of the touch layer 32 in a possible implementation. In the implementation shown in FIG. 31, a plurality of support sections 3232 are also disposed at the connection sub-layer 323 of the touchscreen 30, and in a length direction of each support section 3232, projection of each support section 3232 on the first surface 3221 covers one fracture 32111.

In a possible implementation, a length of the support section 3232 is greater than or equal to 4 μm.

In a possible implementation, refer to FIG. 31. In this implementation, one terminal 32112 of the grid line 3211 has a first length L1, a length of an overlapping part between the projection of the support section 3232 on the first surface 3221 and one terminal 32112 corresponding to the support section 3232 is a second length L2, and the second length L2 is less than or equal to ½L1.

Figure 32:
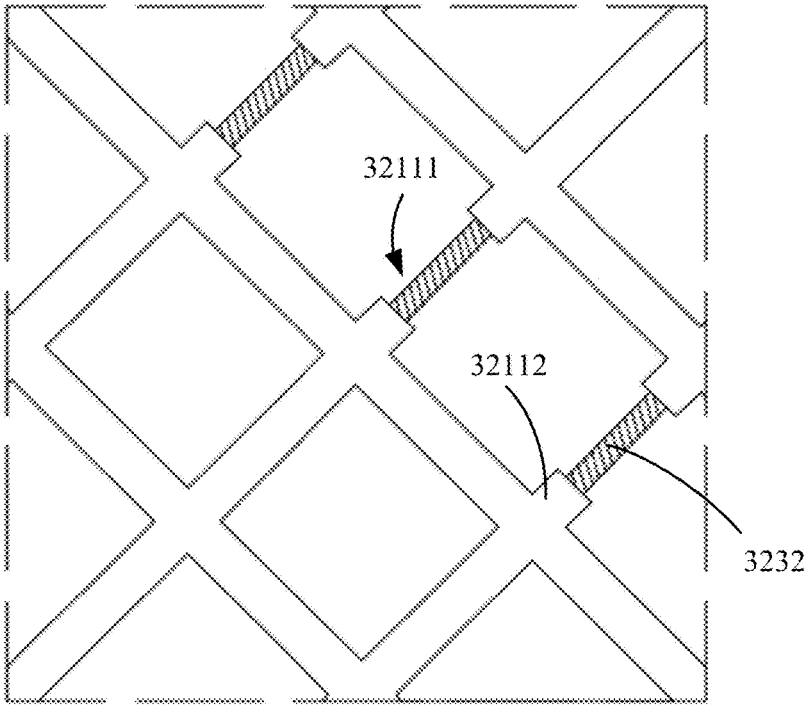
FIG. 32 is a diagram of a partial plane of a grid line in the implementation shown in FIG. 31.

In a possible implementation, FIG. 32 is a diagram of a partial plane of the grid line 3211 in the implementation shown in FIG. 31. In the implementation shown in FIG. 32, the width of the terminal 32112 is greater than or equal to a width of the support section 3232.

Figure 33:
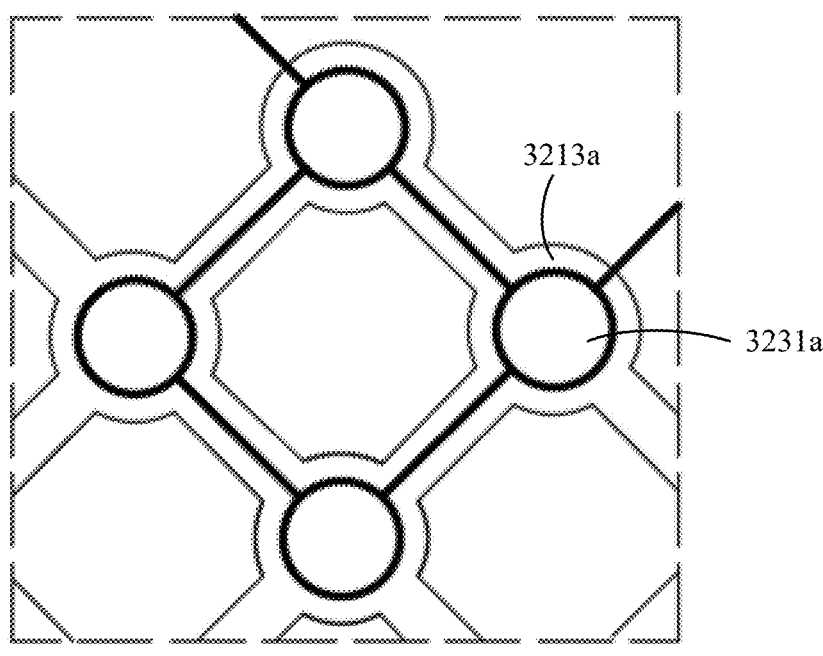
FIG. 33 is a diagram of a partially planar structure of a touch layer in a possible implementation.

In a possible implementation, FIG. 33 is a diagram of a partially planar structure of the touch layer 32 in a possible implementation. In the implementation shown in FIG. 33, the electrode region 3213 also has a first connection end 3213a at the via 3223, the connection section 3231 also has a second connection end 3231a at the via 3223, and projection of the second connection end 3231a on the first surface 3221 is accommodated in the first connection end 3213a.

In a possible implementation, in the plane direction of the touch layer 32, a distance between an edge of the projection of the second connection end 3231a on the first surface 3221 and an edge of the first connection end 3213a is from 1 μm to 3 μm.

Figure 34:
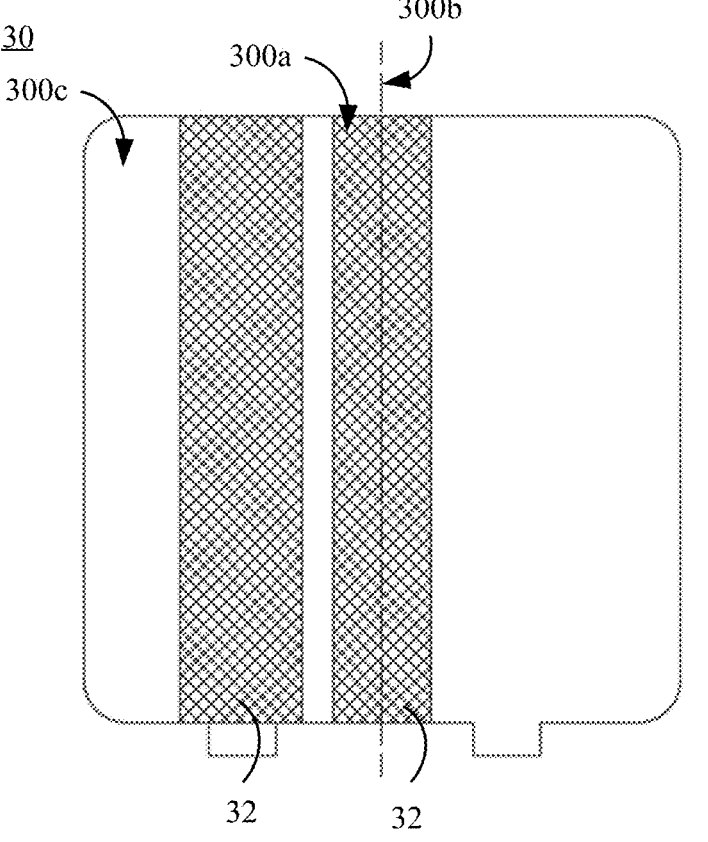
FIG. 34 is a diagram of a partially planar structure of a touchscreen in a possible implementation.

In a possible implementation, FIG. 34 is a diagram of a planar structure of the touchscreen 30 in a possible implementation. In the implementation shown in FIG. 34, the touchscreen 30 further includes a non-bending region 300c, the non-bending region 300c is located on at least one side of the bending region 300a, and the touch layer 32 is further at least partially disposed in the non-bending region 300c.

In a possible implementation, the non-bending region 300c is located on two opposite sides of the bending region 300a.

In a possible implementation, the touch layer 32 completely covers the non-bending region 300c.

It may be understood that, on the touchscreen 30 provided in the present disclosure, the width of the terminal 32112 is set to be greater than the width of the grid line 3211, so that a stress bearing area at the terminal 32112 when the touchscreen 30 is bent can be increased, and the stress generated at the terminal 32112 when the touchscreen 30 is bent can be further dispersed, to improve stress concentration at the terminal 32112 during bending, avoid a crack, a break, or the like of each film layer at the touch layer 32 at the fracture 32111, and improve use reliability and a service life of the touchscreen 30.

It should be noted that specific structures and technical effect in the foregoing implementations are respectively the same as or similar to specific structures and technical effect in corresponding implementations of the touchscreen 10. Details are not described herein one by one in this embodiment.

Figures 35, 36:
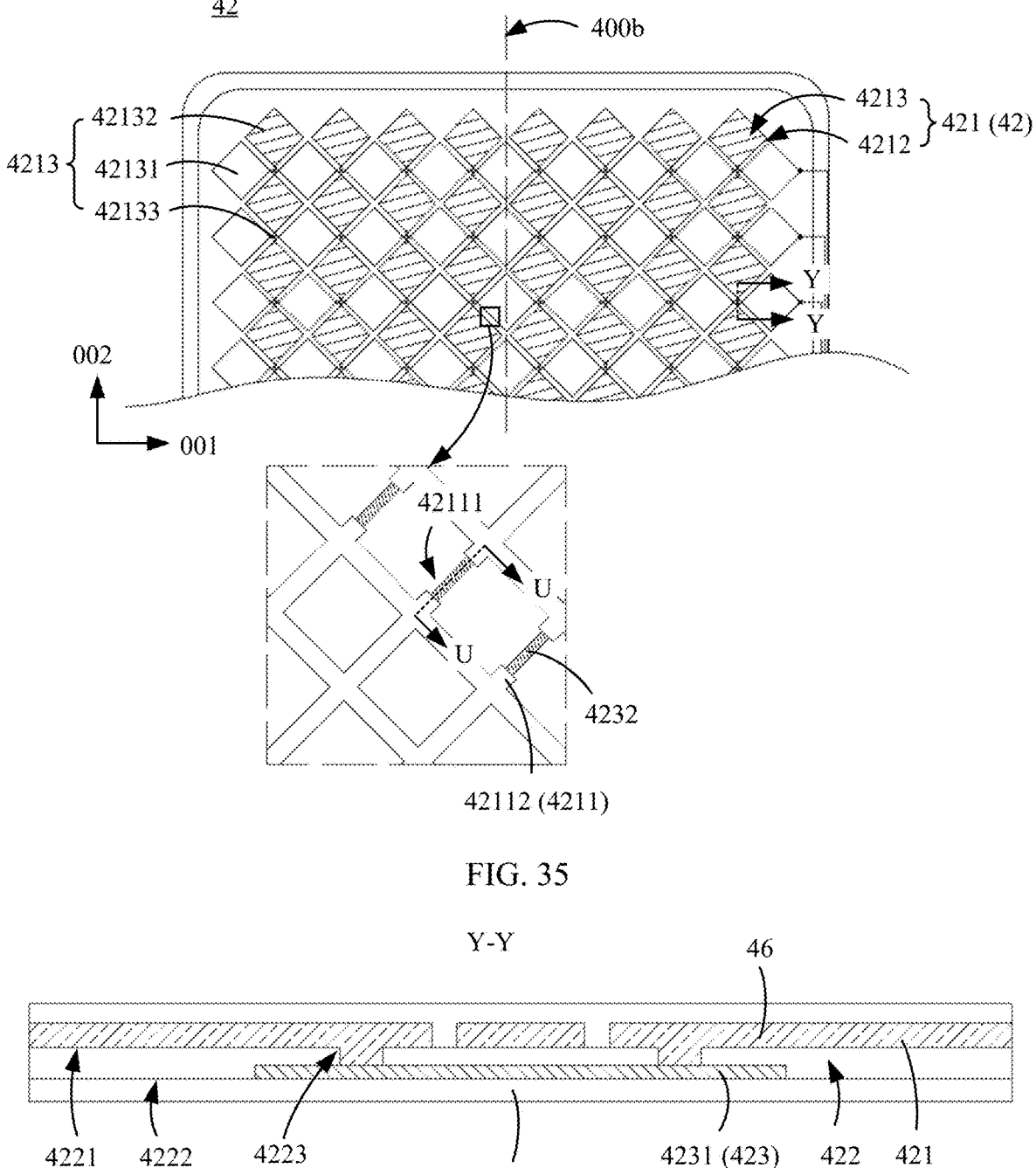
FIG. 35 is a diagram of a partially planar structure of a touch layer of another touchscreen according to the present disclosure.
FIG. 36 is a diagram of a sectional structure of the touch layer in a position Y-Y in the embodiment shown in FIG. 35.

Refer to both FIG. 35 and FIG. 36. FIG. 35 is a diagram of a partially planar structure of a touch layer 42 of another touchscreen 40 according to the present disclosure, and FIG. 36 is a diagram of a sectional structure of the touch layer 42 in a position Y-Y in the embodiment shown in FIG. 35. The touchscreen 40 includes a plurality of film layer structures that are the same as those of the touchscreen 10. Therefore, in the touchscreen 40, numbers corresponding to the film layer structures in the touchscreen 10 are the same, and a difference lies in that the reference numerals in the accompanying drawings start with "4" instead of "1".

In the implementation shown in FIG. 35, the touchscreen 40 also has a bending region 400a (refer to FIG. 39), the touch layer 42 is disposed in the bending region 400a, and the touch layer 42 also includes an electrode sub-layer 421, an insulation sub-layer 422, and a connection sub-layer 423. The electrode sub-layer 421 is constructed as a grid line 4211 arranged on a first surface 4221 of the insulation sub-layer 422.

A plurality of channels 4212 for disconnecting the grid line 4211 are also disposed at the touch layer 42, the plurality of channels 4212 divide the grid line 4211 into a plurality of electrode regions 4213, and the grid line 4211 between any two adjacent electrode regions 4213 forms a fracture 42111 at the channel 4212.

As shown in FIG. 36, a plurality of connection sections 4231 are also further disposed at the connection sub-layer 423, a plurality of vias 4223 are disposed at the insulation sub-layer 422, and at least some of the electrode regions 4213 are sequentially conducted through the vias 4223 and the connection sections 4231.

Specifically, in a possible implementation, as shown in FIG. 35, the electrode region 4213 also includes a plurality of first electrodes 42131, a plurality of second electrodes 42132, and a plurality of conduction sections 42133. The plurality of first electrodes 42131 are arranged in an array and staggered with the plurality of second electrodes 42132.

The conduction section 42133 is connected between any two adjacent first electrodes 42131 in a first direction 001, to conduct the plurality of first electrodes 42131 in the first direction 001.

The connection section 4231 is connected between any two adjacent second electrodes 42132 in a second direction 002, to conduct the plurality of second electrodes 42132 in the second direction 002.

In a possible implementation, the first electrode 42131 is a touch driving electrode Tx, and the second electrode 42132 is a touch sensing electrode Rx.

In a possible implementation, the first electrode 42131 is a touch sensing electrode Rx, and the second electrode 42132 is a touch driving electrode Tx.

It may be understood that, on the touchscreen 40 in the present disclosure, the grid line 4211 is also arranged at the touch layer 42, and the plurality of channels 4212 are disposed to disconnect the grid line 4211, so that the grid line 4211 can be divided into the plurality of independent electrode regions 4213, to implement touch sensing and detection functions of the touch layer 42 through cooperation between the plurality of electrode regions 4213, and enable the touchscreen 40 to implement touch control effect.

In a possible implementation, refer to FIG. 36. In this implementation, the touchscreen 40 further includes a flexible substrate 45 and an organic coating layer 46, the touch layer 42 is stacked between the flexible substrate 45 and the organic coating layer 46, and the electrode sub-layer 421 of the touch layer 42 is disposed on a side that is of the insulation sub-layer 422 and that is away from the flexible substrate 35.

In a possible implementation, the touchscreen 40 further includes a buffer layer 47 (refer to FIG. 37), and the buffer layer 47 is connected between the flexible substrate 45 and the connection sub-layer 423 of the touch layer 42 and is configured to relieve pressure on the touch layer 42.

Figure 37:
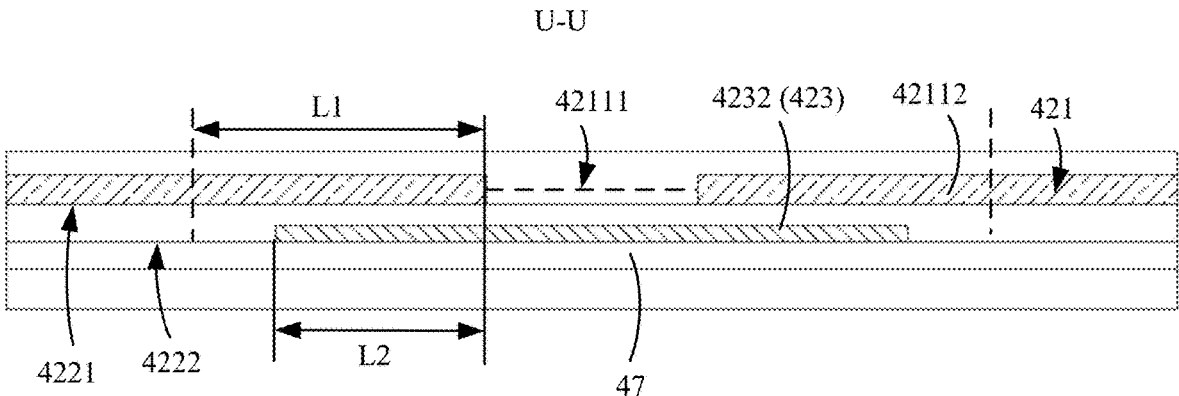
FIG. 37 is a diagram of a sectional structure in a position U-U in the implementation shown in FIG. 35.

Further, refer to both FIG. 35 and FIG. 37. FIG. 37 is a diagram of a sectional structure in a position U-U in the implementation shown in FIG. 35. In this implementation, a plurality of support sections 4232 are also disposed at the connection sub-layer 423 of the touchscreen 40, and in a length direction of each support section 4232, projection of each support section 4232 on the first surface 4221 covers one fracture 42111.

In a possible implementation, a length of the support section 4232 is greater than or equal to 4 μm.

In this implementation, the length of the support section 4232 is set to be greater than or equal to 4 μm, so that a stress bearing capacity of the support section 4232 can be ensured, to further improve a stress bearing capacity of the connection sub-layer 423 at the fracture 42111.

In a possible implementation, refer to FIG. 35. As shown in FIG. 35, a width of the terminal 42112 is greater than or equal to the width of the support section 4232.

In a possible implementation, the width of the terminal 42112 is greater than or equal to the width of the support section 4232.

In this implementation, the width of the terminal 42112 is set to be greater than or equal to the width of the support section 4232, so that the stress bearing capacity of the connection sub-layer 423 during bending can be improved, and the support section 4232 does not affect light emission during display of a display layer of a touchscreen, to improve use effect and applicability of the touch layer 42.

In a possible implementation, refer to FIG. 37. In this implementation, one terminal 42112 of the grid line 4211 has a first length L1, a length of an overlapping part between the projection of the support section 4232 on the first surface 4221 and one terminal 42112 corresponding to the support section 4232 is a second length L2, and the second length L2 is less than or equal to ½L1.

In this implementation, the length of the overlapping part between the projection of the support section 4232 on the first surface 4221 and the terminal 42112 corresponding to the support section 4232 is set to be the second length L2, and the second length L2 is less than or equal to ½L1, so that an overlapping length between the support section 4232 and the terminal 42112 in a direction in which the electrode sub-layer 421 is opposite to the insulation sub-layer 422 can be ensured, to further ensure the stress bearing capacity of the support section 4232.

In a possible implementation, a width of the fracture 42111 is greater than or equal to 8 μm.

In a possible implementation, a length of the terminal 42112 is from 0.5 μm to 3 μm.

In a possible implementation, the width of the terminal 42112 is greater than a width of the grid line 4211.

In a possible implementation, the width of the terminal 42112 is greater than or equal to 3.5 μm.

In a possible implementation, in the plane direction of the touch layer 42, a shape of a boundary at which the terminal 42112 is constructed as the fracture 42111 is an arc.

In a possible implementation, in the plane direction of the touch layer 42, the shape of the boundary at which the terminal 42112 is constructed as the fracture 42111 is a circular arc.

In a possible implementation, each fracture 42111 is parallel to a bending central axis 400*b* of the bending region.

Figure 38:
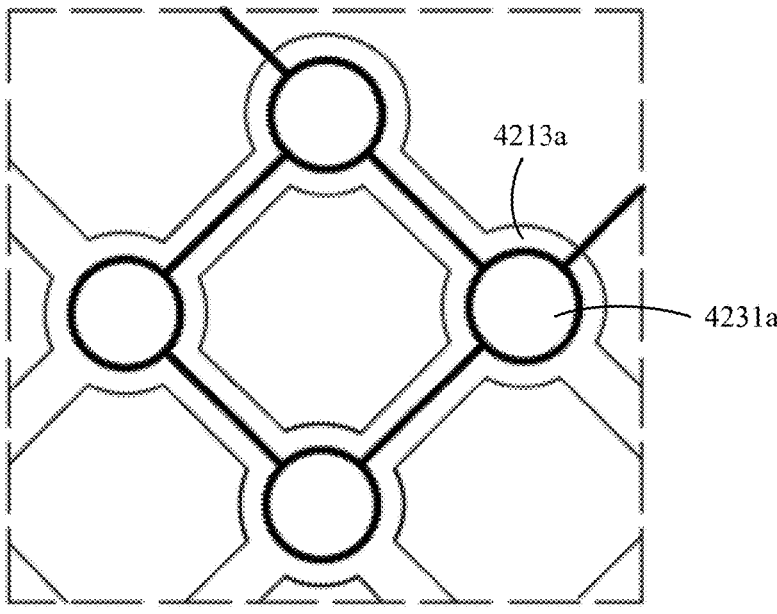
FIG. 38 is a diagram of a partially planar structure of a touch layer in a possible implementation.

In a possible implementation, FIG. 38 is a diagram of a partially planar structure of the touch layer 42 in a possible implementation. In the implementation shown in FIG. 38, the electrode region 4213 also has a first connection end 4213*a* at the via 4223, the connection section 4231 also has a second connection end 4231*a* at the via 4223, and projection of the second connection end 4231*a* on the first surface 4221 is accommodated in the first connection end 4213*a*.

In a possible implementation, in the plane direction of the touch layer 42, a distance between an edge of the projection of the second connection end 4231*a* on the first surface 4221 and an edge of the first connection end 4213*a* is from 1 μm to 3 μm.

Figure 39:
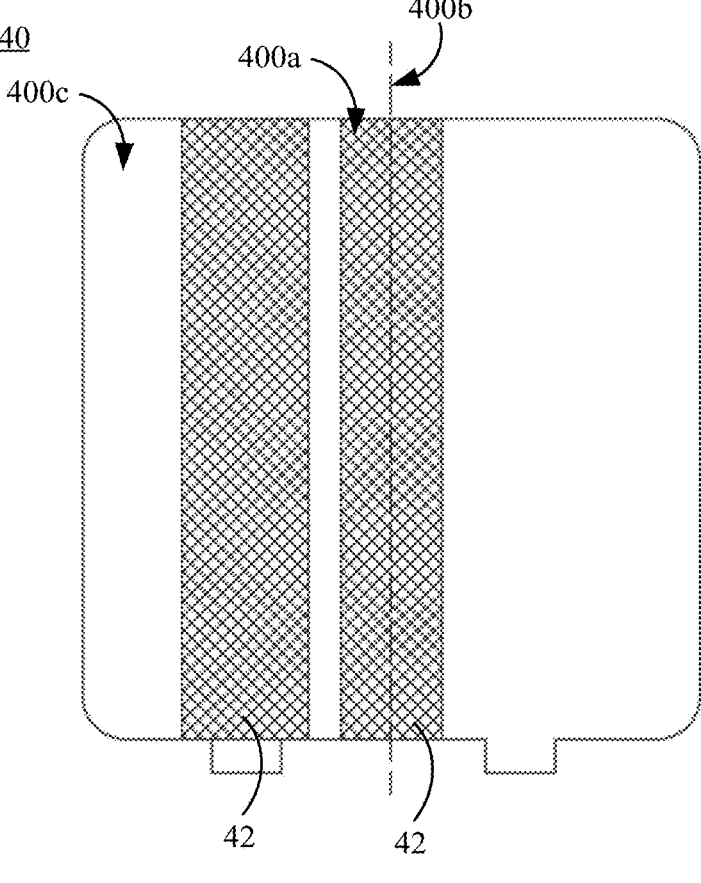
FIG. 39 is a diagram of a partially planar structure of a touchscreen in a possible implementation.

In a possible implementation, FIG. 39 is a diagram of a partially planar structure of the touchscreen 40 in a possible implementation. In the implementation shown in FIG. 39, the touchscreen 40 further includes a non-bending region 400*c*, the non-bending region 400*c* is located on at least one side of the bending region 400*a*, and the touch layer 42 is further at least partially disposed in the non-bending region 400*c*.

In a possible implementation, the non-bending region 400*c* is located on two opposite sides of the bending region 400*a*.

In a possible implementation, the touch layer 42 completely covers the non-bending region 400*c*.

It may be understood that, on the touchscreen 40 in the present disclosure, the support section 4232 is disposed at the touch layer 42, and in the length direction of each support section 4232, the projection of each support section 4232 on the first surface 4221 is disposed to cover one fracture 42111. In this way, the support section 4232 overlaps the terminal 42112 in the direction in which the electrode sub-layer 421 is opposite to the insulation sub-layer 422, so that the support section 4232 functions as a reinforcing rib at the connection sub-layer 423, that is, the stress bearing capacity of the connection sub-layer 423 at the fracture 42111 can be enhanced, and a crack, a break, or the like of the connection sub-layer 423 at the fracture 42111 can be avoided.

It should be noted that specific structures and technical effect in the foregoing implementations are respectively the same as or similar to specific structures and technical effect in corresponding implementations of the touchscreen 10. Details are not described herein one by one in this embodiment.

Figures 40, 41:
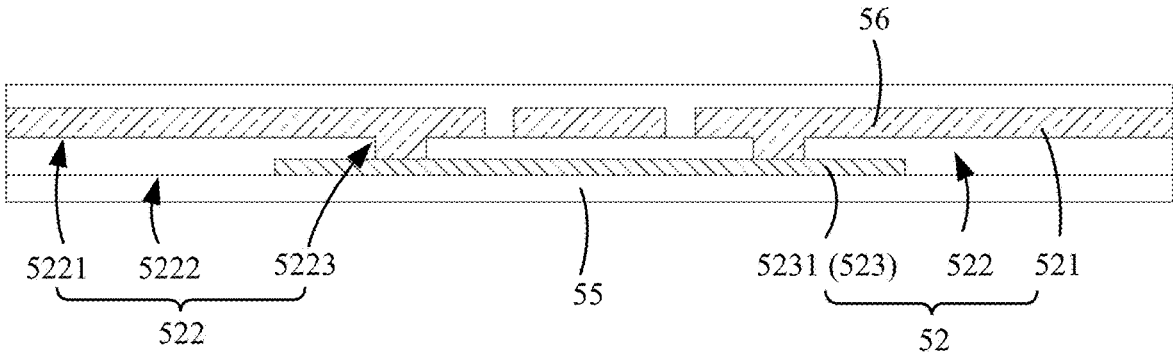
FIG. 40 is a diagram of a partially planar structure of a touch layer of another touchscreen according to the present disclosure.
FIG. 41 is a diagram of a sectional structure of a perspective of the touch layer in the embodiment shown in FIG. 40.

Refer to both FIG. 40 and FIG. 41. FIG. 40 is a diagram of a partially planar structure of a touch layer 52 of another touchscreen 50 according to the present disclosure, and FIG.

41 is a diagram of a sectional structure of a perspective of the touch layer 52 in the embodiment shown in FIG. 40. The touchscreen 50 includes a plurality of film layer structures that are the same as those of the touchscreen 10. Therefore, in the touchscreen 50, numbers corresponding to the film layer structures in the touchscreen 10 are the same, and a difference lies in that the reference numerals in the accompanying drawings start with "5" instead of "1".

In the implementation shown in FIG. 40, the touchscreen 50 also has a bending region 500a, the touch layer 52 is disposed in the bending region 500a, and the touch layer 52 also includes an electrode sub-layer 521, an insulation sub-layer 522, and a connection sub-layer 523. The electrode sub-layer 521 is constructed as a grid line 5211 arranged on a first surface 5221 of the insulation sub-layer 522.

A plurality of channels 5212 for disconnecting the grid line 5211 are also disposed at the touch layer 52, the plurality of channels 5212 divide the grid line 5211 into a plurality of electrode regions 5213, and the grid line 5211 between any two adjacent electrode regions 5213 forms a fracture 52111 at the channel 5212.

As shown in FIG. 41, a plurality of connection sections 5231 are also further disposed at the connection sub-layer 523, a plurality of vias 5223 are disposed at the insulation sub-layer 522, and at least some of the electrode regions 5213 are sequentially conducted through the vias 5223 and the connection sections 5231.

Specifically, in a possible implementation, as shown in FIG. 40, the electrode region 5213 also includes a plurality of first electrodes 52131, a plurality of second electrodes 52132, and a plurality of conduction sections 52133. The plurality of first electrodes 52131 are arranged in an array and staggered with the plurality of second electrodes 52132.

The conduction section 5232 is connected between any two adjacent first electrodes 52131 in a first direction 001, to conduct the plurality of first electrodes 52131 in the first direction 001.

The connection section 5231 is connected between any two adjacent second electrodes 52132 in a second direction 002, to conduct the plurality of second electrodes 52132 in the second direction 002.

In a possible implementation, the first electrode 52131 is a touch driving electrode Tx, and the second electrode 52132 is a touch sensing electrode Rx.

In a possible implementation, the first electrode 52131 is a touch sensing electrode Rx, and the second electrode 52132 is a touch driving electrode Tx.

It may be understood that, on the touchscreen 50 in the present disclosure, the grid line 5211 is also arranged at the touch layer 52, and the plurality of channels 5212 are disposed to disconnect the grid line 5211, so that the grid line 5211 can be divided into the plurality of independent electrode regions 5213, to implement touch sensing and detection functions of the touch layer 52 through cooperation between the plurality of electrode regions 5213, and enable the touchscreen 50 to implement touch control effect.

Further, in the implementation shown in FIG. 40, the electrode region 5213 has a first connection end 5213a at the via 5223, the connection section 5231 has a second connection end 5231a at the via 5223, and projection of the second connection end 5231a on the first surface 5221 is accommodated in the first connection end 5213a.

In a possible implementation, in a plane direction of the touch layer 52, a distance between an edge of the projection of the second connection end 5231a on the first surface 5221 and an edge of the first connection end 5213a is from 1 μm to 3 μm.

It may be understood that, in this implementation, the distance between the edge of the projection of the second connection end 5231a on the first surface 5221 and the edge of the first connection end 5213a is set to 1 μm to 3 μm, so that a stress bearing area of the first connection end 5213a can be ensured, and impact of the first connection end 5213a on light emission during display of the touchscreen 50 can be avoided, to improve use effect and applicability of the touch layer 52.

In a possible implementation, as shown in FIG. 41, in this implementation, the touchscreen 50 further includes a flexible substrate 55 and an organic coating layer 56, the touch layer 52 is stacked between the flexible substrate 55 and the organic coating layer 56, and the electrode sub-layer 521 of the touch layer 52 is disposed on a side that is of the insulation sub-layer 522 and that is away from the flexible substrate 55.

In a possible implementation, the touchscreen 50 further includes a buffer layer 57 (refer to FIG. 43), and the buffer layer 57 is connected between the flexible substrate 55 and the connection sub-layer 523 of the touch layer 52 and is configured to relieve pressure on the touch layer 52.

In a possible implementation, a width of the fracture 52111 is greater than or equal to 8 μm.

Figure 42:
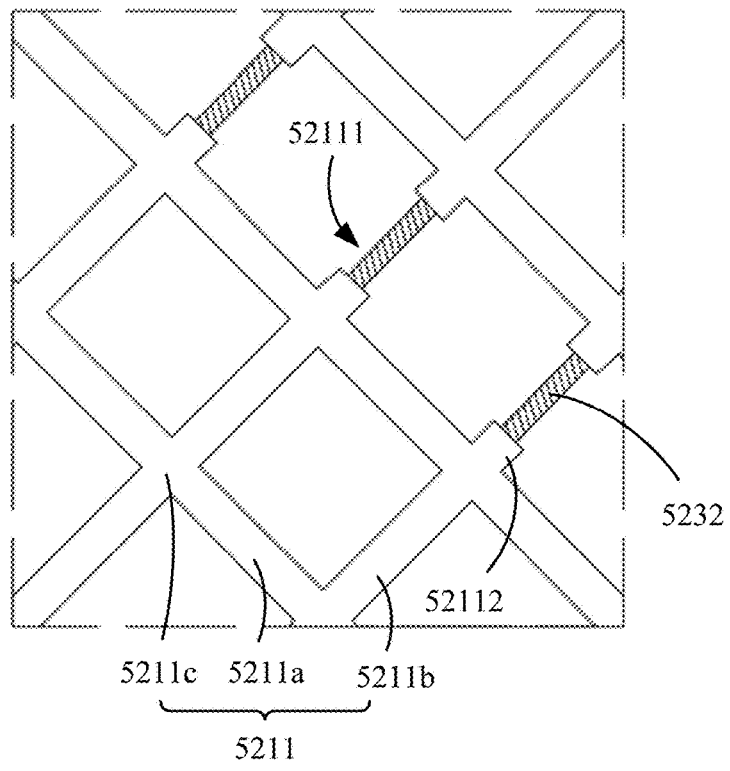
FIG. 42 is a diagram of a partially planar structure of a touch layer in a possible implementation.
Figure 43:
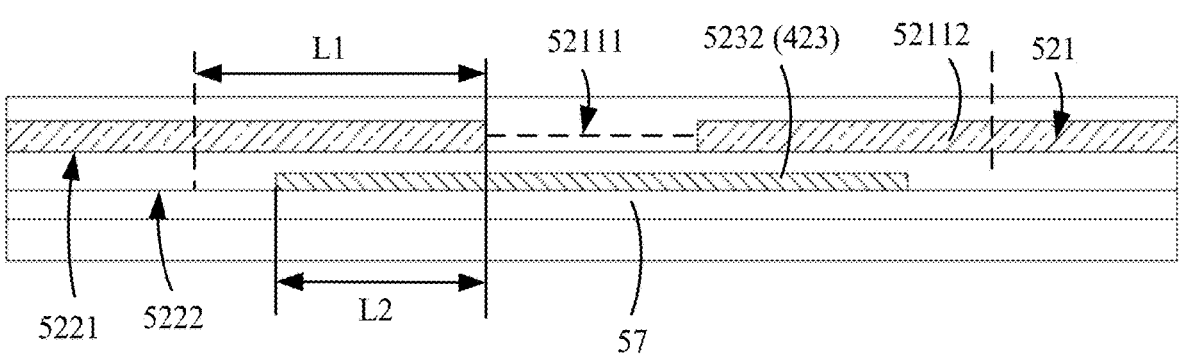
FIG. 43 is a diagram of a sectional structure of a perspective in the implementation shown in FIG. 42.

In a possible implementation, refer to both FIG. 42 and FIG. 43. FIG. 42 is a diagram of a partially planar structure of the touch layer 52 in a possible implementation, and FIG. 43 is a diagram of a sectional structure of a perspective in the implementation shown in FIG. 42. In the implementation shown in FIG. 42, the grid line 5211 includes a plurality of first sub-grid lines 5211a that are parallel to each other and a plurality of second sub-grid lines 5211b that are parallel to each other, and any first sub-grid line 5211a intersects the plurality of second sub-grid lines 5211b to form a plurality of intersection parts 5211c. The grid line 5211 has a terminal 52112 at the fracture 52111, one end of the terminal 52112 communicates with the intersection part 5211c, and the other end of the terminal 52112 is constructed as a boundary of the fracture 52111.

In the implementation shown in FIG. 42, a plurality of support sections 5232 are also disposed at the connection sub-layer 523 of the touch layer 52, and in a length direction of each support section 5232, projection of each support section 5232 on the first surface 5221 covers one fracture 52111.

In a possible implementation, a length of the support section 5232 is greater than or equal to 4 μm.

In a possible implementation, a width of the terminal 52112 is greater than or equal to a width of the support section 5232.

In a possible implementation, refer to FIG. 43. In this implementation, one terminal 52112 of the grid line 5211 has a first length L1, a length of an overlapping part between the projection of the support section 5232 on the first surface 5221 and one terminal 52112 corresponding to the support section 5232 is a second length L2, and the second length L2 is less than or equal to ½L1.

In a possible implementation, a length of the terminal 52112 is from 0.5 μm to 3 μm.

In a possible implementation, the width of the terminal 52112 is greater than a width of the grid line 5211.

In a possible implementation, the width of the terminal 52112 is greater than or equal to 3.5 μm.

Figure 44:
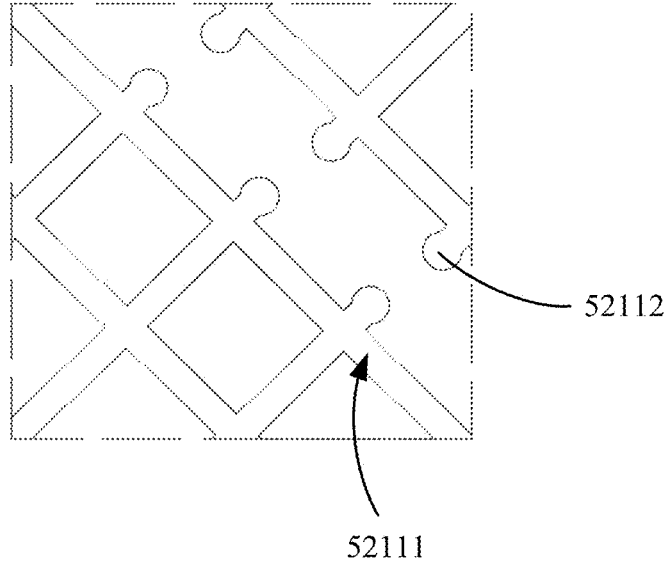
FIG. 44 is a diagram of a partially planar structure of the touch layer shown in FIG. 40 in a possible implementation.

In a possible implementation, FIG. 44 is a diagram of a partially planar structure of the touch layer 52 shown in FIG. 40 in a possible implementation. In the implementation shown in FIG. 44, in the plane direction of the touch layer 52, a shape of the boundary at which the terminal 52112 is constructed as the fracture 52111 is a circular arc.

In a possible implementation, in the plane direction of the touch layer 52, the shape of the boundary at which the terminal 52112 is constructed as the fracture 52111 is an arc.

Figure 45:
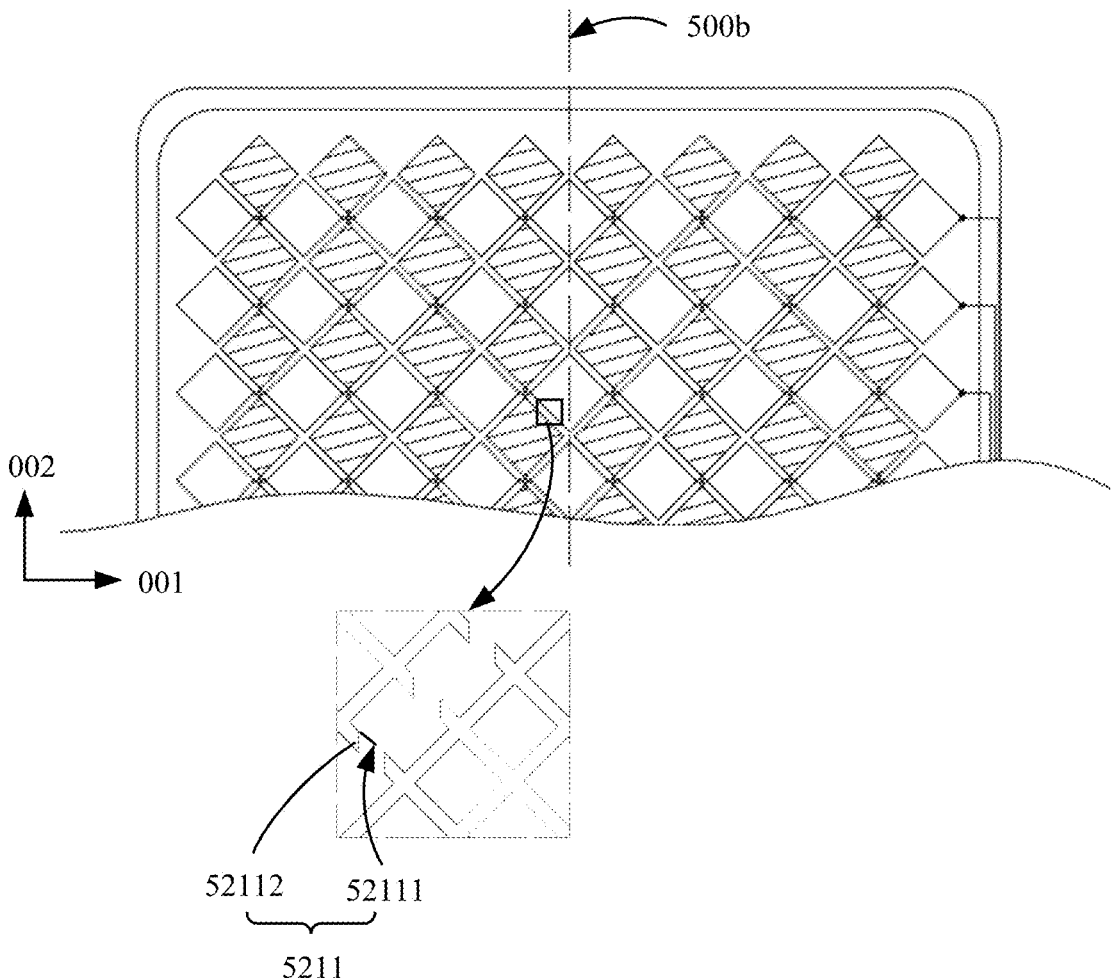
FIG. 45 is a diagram of a partially planar structure of the touch layer shown in FIG. 40 in a possible implementation.

In a possible implementation, FIG. 45 is a diagram of a partially planar structure of the touch layer 52 shown in FIG. 40 in a possible implementation. As shown in FIG. 45, each fracture 52111 is parallel to a bending central axis 500*b* of the bending region 500*a*.

Figure 46:
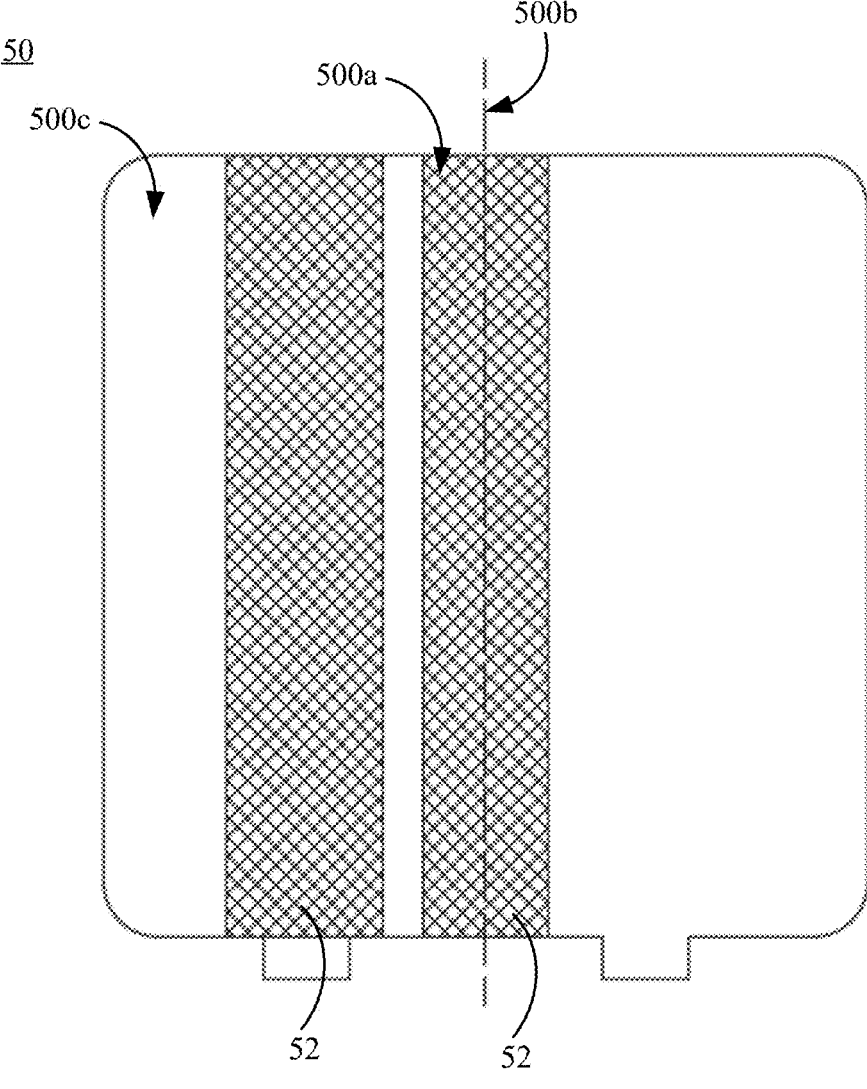
FIG. 46 is a diagram of a planar structure of a touchscreen in a possible implementation.

In a possible implementation, FIG. 46 is a diagram of a planar structure of the touchscreen 50 in a possible implementation. In the implementation shown in FIG. 46, the touchscreen 50 further includes a non-bending region 500*c*, the non-bending region 500*c* is located on at least one side of the bending region 500*a*, and the touch layer 52 is further at least partially disposed in the non-bending region 500*c*.

In a possible implementation, the non-bending region 500*c* is located on two opposite sides of the bending region 500*a*.

In a possible implementation, the touch layer 52 completely covers the non-bending region 500*c*.

It may be understood that, on the touchscreen 50 in the present disclosure, the projection of the second connection end 5231*a* on the first surface 5221 is disposed to be accommodated in the first connection end 5213*a*, to increase a stress bearing area of the grid line 5211, thereby avoiding stress concentration at the first connection end 5213*a* and avoiding a crack, a break, or the like of each film layer at the touch layer 52 at the fracture, so as to improve use reliability and a service life of the touchscreen 50.

It should be noted that specific structures and technical effect in the foregoing implementations are respectively the same as or similar to specific structures and technical effect in corresponding implementations of the touchscreen 10. Details are not described herein one by one in this embodiment.

It may be understood that the electronic device 100 provided in the present disclosure implements the touch control function via the touchscreen 10. The electronic device 100 cooperates with the touchscreen 10 in any one of the foregoing implementations of the present disclosure, to reduce stress concentration of each film layer structure when the touchscreen is bent and avoid a possible break or crack of each film layer when the touchscreen is bent, thereby ensuring use reliability and user experience of the electronic device 100 in the present disclosure.

In other words, because the electronic device 100 provided in the present disclosure uses any touchscreen in any one of the implementations, the electronic device 100 provided in the present disclosure has all possible beneficial effect of the touchscreen provided in any one of the foregoing implementations.

Certainly, the foregoing implementations may be separately used, or may be used in combination. The foregoing descriptions are merely preferred implementations of the present disclosure. It should be noted that a person of ordinary skill in the art may make several improvements or polishing without departing from the principle of the present disclosure and the improvements or polishing shall fall within the protection scope of the present disclosure.

The invention claimed is:

1. A touchscreen, comprising:
   a bending region, wherein a touch layer is disposed in the bending region, a grid line is arranged at the touch layer, a plurality of channels for disconnecting the grid line are further disposed at the touch layer, the plurality of channels divide the grid line into a plurality of electrode regions, a grid line between any two adjacent electrode regions forms a fracture at a channel, and a width of the fracture is greater than or equal to 8 μm.

2. The touchscreen of claim 1, wherein the grid line comprises a plurality of first sub-grid lines that are parallel to each other and a plurality of second sub-grid lines that are parallel to each other, and any first sub-grid line intersects the plurality of second sub-grid lines to form a plurality of intersection parts, and
   wherein the grid line has a terminal at the fracture, one end of the terminal communicates with the intersection part, the other end of the terminal is constructed as a boundary of the fracture, and a length of the terminal is from 0.5 μm to 3 μm.

3. The touchscreen of claim 1, wherein the touch layer comprises an electrode sub-layer, an insulation sub-layer, and a connection sub-layer that are stacked, the electrode sub-layer is constructed as the grid line arranged on a first surface of the insulation sub-layer, the plurality of channels for disconnecting the grid line are further disposed at the electrode sub-layer, and the plurality of channels divide the grid line into the plurality of electrode regions, and
   wherein the connection sub-layer is located on a second surface that is of the insulation sub-layer and that is away from the first surface, a plurality of connection sections are disposed at the connection sub-layer, a plurality of vias are disposed at the insulation sub-layer, and at least some of the electrode regions are sequentially conducted through the vias and the connection sections.

4. The touchscreen of claim 3, wherein the electrode region comprises a plurality of first electrodes, a plurality of second electrodes, and a plurality of conduction sections, the plurality of first electrodes are arranged in an array and staggered with the plurality of second electrodes, and the conduction section is coupled between any two adjacent first electrodes in a first direction, to conduct the plurality of first electrodes in the first direction,
   wherein the connection section is coupled between any two adjacent second electrodes in a second direction, to sequentially conduct the plurality of second electrodes in the second direction, and wherein an included angle is between the first direction and the second direction.

5. The touchscreen of claim 4, wherein the first electrode is a touch driving electrode, and the second electrode is a touch sensing electrode; or
   the first electrode is a touch sensing electrode, and the second electrode is a touch driving electrode.

6. The touchscreen of claim 3, wherein the touchscreen further comprises a flexible substrate and an organic coating layer, the touch layer is stacked between the flexible substrate and the organic coating layer, and the electrode sub-layer of the touch layer is disposed on a side that is of the insulation sub-layer and that is away from the flexible substrate.

7. The touchscreen of claim 6, wherein the touchscreen further comprises a buffer layer, and the buffer layer is coupled between the flexible substrate and the connection sub-layer of the touch layer and is configured to relieve pressure on the touch layer.

8. The touchscreen of claim 1, wherein the touchscreen further comprises a non-bending region, the non-bending region is located on at least one side of the bending region, and the touch layer is further at least partially disposed in the non-bending region.

9. A touchscreen, comprising:

a bending region, wherein a touch layer is disposed in the bending region, the touch layer comprises an electrode sub-layer, an insulation sub-layer, and a connection sub-layer that are stacked, the electrode sub-layer is constructed as a grid line arranged on a first surface of the insulation sub-layer, a plurality of channels for disconnecting the grid line are further disposed at the electrode sub-layer, the plurality of channels divide the grid line into a plurality of electrode regions, a grid line between any two adjacent electrode regions forms a fracture at a channel, the connection sub-layer is located on a second surface that is of the insulation sub-layer and that is away from the first surface, a plurality of support sections are disposed at the connection sub-layer, and in a length direction of each support section, projection of each support section on the first surface covers one fracture.

10. The touchscreen of claim 9, wherein a length of the support section is greater than or equal to 4 μm.

11. The touchscreen of claim 9, wherein the grid line has a terminal at the fracture, and the terminal is constructed as a boundary of the fracture, and wherein one terminal has a first length L1, a length of an overlapping part between the projection of the support section on the first surface and the terminal is a second length L2, and the second length L2 is less than or equal to ½L1.

12. The touchscreen of claim 11, wherein a width of the terminal is greater than or equal to a width of the support section.

13. The touchscreen of claim 9, wherein a plurality of connection sections are further disposed at the connection sub-layer, a plurality of vias are disposed at the insulation sub-layer, and at least some of the electrode regions are sequentially conducted through the vias and the connection sections.

14. A touchscreen, comprising:

a bending region, wherein a touch layer is disposed in the bending region, the touch layer comprises an electrode sub-layer, an insulation sub-layer, and a connection sub-layer that are stacked, the electrode sub-layer is constructed as a grid line arranged on a first surface of the insulation sub-layer, a plurality of channels for disconnecting the grid line are further disposed at the electrode sub-layer, the plurality of channels divide the grid line into a plurality of electrode regions, a grid line between any two adjacent electrode regions forms a fracture at a channel, the connection sub-layer is located on a second surface that is of the insulation sub-layer and that is away from the first surface, a plurality of connection sections are disposed at the connection sub-layer, a plurality of vias are disposed at the insulation sub-layer, at least some of the electrode regions are sequentially conducted through the vias and the connection sections, the electrode region has a first connection end at the via, the connection section has a second connection end at the via, and projection of the second connection end on the first surface is accommodated in the first connection end.

15. The touchscreen of claim 14, wherein in a plane direction of the touch layer, a distance between an edge of the projection of the second connection end on the first surface and an edge of the first connection end is from 1 μm to 3 μm.

16. An electronic device, comprising:

a housing; and a touchscreen fastened to the housing, wherein the touchscreen includes a bending region, and a touch layer is disposed in the bending region, wherein a grid line is arranged at the touch layer, and a plurality of channels for disconnecting the grid line are further disposed at the touch layer, and wherein the plurality of channels divide the grid line into a plurality of electrode regions, a grid line between any two adjacent electrode regions forms a fracture at a channel, and a width of the fracture is greater than or equal to 8 μm.

17. The electronic device of claim 16, wherein the grid line comprises a plurality of first sub-grid lines that are parallel to each other and a plurality of second sub-grid lines that are parallel to each other, and any first sub-grid line intersects the plurality of second sub-grid lines to form a plurality of intersection parts, and wherein the grid line has a terminal at the fracture, one end of the terminal communicates with the intersection part, the other end of the terminal is constructed as a boundary of the fracture, and a length of the terminal is from 0.5 μm to 3 μm.

18. The electronic device of claim 16, wherein the touch layer comprises an electrode sub-layer, an insulation sub-layer, and a connection sub-layer that are stacked, the electrode sub-layer is constructed as the grid line arranged on a first surface of the insulation sub-layer, the plurality of channels for disconnecting the grid line are further disposed at the electrode sub-layer, and the plurality of channels divide the grid line into the plurality of electrode regions, and wherein the connection sub-layer is located on a second surface that is of the insulation sub-layer and that is away from the first surface, a plurality of connection sections are disposed at the connection sub-layer, a plurality of vias are disposed at the insulation sub-layer, and at least some of the electrode regions are sequentially conducted through the vias and the connection sections.

19. The electronic device of claim 18, wherein the electrode region comprises a plurality of first electrodes, a plurality of second electrodes, and a plurality of conduction sections, the plurality of first electrodes are arranged in an array and staggered with the plurality of second electrodes, and the conduction section is coupled between any two adjacent first electrodes in a first direction, to conduct the plurality of first electrodes in the first direction, wherein the connection section is coupled between any two adjacent second electrodes in a second direction, to sequentially conduct the plurality of second electrodes in the second direction, and wherein an included angle is between the first direction and the second direction.

20. The electronic device of claim 19, wherein the first electrode is a touch driving electrode, and the second electrode is a touch sensing electrode; or the first electrode is a touch sensing electrode, and the second electrode is a touch driving electrode.

* * * * *